(12) United States Patent
Zhdanov

(10) Patent No.: US 9,110,183 B2
(45) Date of Patent: *Aug. 18, 2015

(54) SYSTEMS AND METHODS FOR REMOTE ELECTROMAGNETIC EXPLORATION FOR MINERAL AND ENERGY RESOURCES USING STATIONARY LONG-RANGE TRANSMITTERS

(71) Applicant: TechnoImaging, LLC, Salt Lake City, UT (US)

(72) Inventor: Michael S. Zhdanov, Holladay, UT (US)

(73) Assignee: TECHNOIMAGING, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/971,659

(22) Filed: Aug. 20, 2013

(65) Prior Publication Data

US 2013/0338923 A1    Dec. 19, 2013

Related U.S. Application Data

(63) Continuation-in-part of application No. 12/695,834, filed on Jan. 28, 2010, now Pat. No. 8,564,296, and a continuation-in-part of application No. 11/676,936, filed on Feb. 20, 2007, now Pat. No. 7,969,152.

(60) Provisional application No. 61/148,946, filed on Jan. 31, 2009, provisional application No. 60/868,905, filed on Dec. 6, 2006.

(51) Int. Cl.
*G01V 3/12* (2006.01)
*G01V 3/08* (2006.01)
*G01V 3/15* (2006.01)

(52) U.S. Cl.
CPC ........ *G01V 3/08* (2013.01); *G01V 3/083* (2013.01); *G01V 3/12* (2013.01); *G01V 3/15* (2013.01)

(58) Field of Classification Search
CPC ............ G01V 1/38; G01V 3/08; G01V 3/12; G01V 3/15
USPC .......................................... 324/334, 335, 345
See application file for complete search history.

(56) References Cited

U.S. PATENT DOCUMENTS 2,794,949 A    6/1957 Hedstrom et al.
3,214,616 A   10/1965 Way et al.
(Continued)

FOREIGN PATENT DOCUMENTS

GB          1294484        10/1972
WO    WO 2006/134329      12/2006
(Continued)

OTHER PUBLICATIONS

U.S. Appl. No. 13/183,680, filed Jul. 15, 2011, Zhdanov.
(Continued)

*Primary Examiner* — Reena Aurora
(74) *Attorney, Agent, or Firm* — Workman Nydegger

(57) ABSTRACT

A method for measuring the resistivity of geologic formations is described. An electromagnetic field may be generated using at least one stationary long-range transmitter. The frequency of the electromagnetic field may be between and/or including the ULF/ELF range. At least one component of the electromagnetic field may be measured by land, marine, submarine, and/or airborne receiver. A conductivity distribution may be determined based on the at least one measured component. The determined conductivity distribution may be correlated with geological formations and/or hydrocarbon deposits.

28 Claims, 21 Drawing Sheets

(56) References Cited

U.S. PATENT DOCUMENTS

| | | |
|---|---|---|
| 3,521,153 A | 7/1970 | Moss |
| 3,887,923 A | 6/1975 | Hendrix |
| 4,492,924 A | 1/1985 | Nilsson |
| 4,814,711 A | 3/1989 | Olsen et al. |
| 5,053,783 A | 10/1991 | Papadopoulos |
| 5,175,500 A | 12/1992 | McNeill |
| 5,610,523 A | 3/1997 | Elliot |
| 5,770,945 A | 6/1998 | Constable |
| 6,253,100 B1 | 6/2001 | Zhdanov |
| 6,603,313 B1 | 8/2003 | Srnka |
| 6,628,119 B1 | 9/2003 | Eidesmo et al. |
| 6,677,756 B2 | 1/2004 | Fanini et al. |
| 6,879,735 B1 | 4/2005 | Portniaguine et al. |
| 6,900,640 B2 | 5/2005 | Fanini et al. |
| 7,126,338 B2 | 10/2006 | MacGregor et al. |
| 7,176,680 B1 | 2/2007 | Veryaskin |
| 7,550,969 B2 | 6/2009 | Zhdanov |
| 7,969,152 B2 * | 6/2011 | Velikhov et al. .......... 324/335 |
| 2007/0097788 A1 | 5/2007 | Tang et al. |
| 2008/0136420 A1 | 6/2008 | Velikhov et al. |
| 2011/0144472 A1 | 6/2011 | Zhdanov |
| 2011/0283789 A1 | 11/2011 | Veryaskin et al. |
| 2012/0026314 A1 | 2/2012 | Zhdanov |

FOREIGN PATENT DOCUMENTS

| | | |
|---|---|---|
| WO | WO 2008/070200 | 6/2008 |
| WO | WO 2008/092205 | 8/2008 |
| WO | WO 2010/088525 | 8/2010 |
| WO | WO 2012/018505 | 2/2012 |

OTHER PUBLICATIONS

U.S. Appl. No. 60/868,905, filed Dec. 6, 2006, Velikhov et al.
U.S. Appl. No. 61/148,946, filed Jan. 31, 2009, Velikhov et al.
U.S. Appl. No. 61/285,909, filed Dec. 11, 2009, Zhdanov.
U.S. Appl. No. 61/369,985, filed Aug. 2, 2010, Zhdanov.
U.S. Appl. No. 61/506,538, filed Jul. 11, 2011, Zhdanov et al.
U.S. Appl. No. 61/508,504, filed Jul. 15, 2011, Zhdanov et al.
U.S. Appl. No. 61/535,590, filed Sep. 16, 2011, Zhdanov.
U.S. Appl. No. 61/541,722, filed Sep. 30, 2011, Zhdanov.
Constable, S.C. 1990, Marine electromagnetic induction studies: Surveys in Geophysics, 11, pp. 303-326.
Guerin, R., R. Tabbagh, A., and Andrieux, P., 1994, Field and/or resistivity mapping in MT-VLF and implications for data processing: Geophysics, 59, 1695-1712.
Michael S. Zhdanov et al.: "Fast 3D Imaging from a Single Borehole Using Tensor Induction Logging Data", Society of Petrophysicists and Well-Log Analysts, vol. 45, No. 2, Apr. 2004, pp. 167-177, XP002663172.
Alexander Gribenko and Michael Zhdanov: "Regularized integral-equation based inversion of tensor induction logging data in three-dimensional formations", Society of Exploration Geophysicists, ISSN: 1052-3812, DOI: doi: 10.1190/1.2792470.
Krieghauser et al—Improved shale sand interpretation in highly deviated and horizontal wells using multi-component induction log data: 42st Annual LoggingSymposium, SPWLA, Transactions, paper S and An efficient and accurate pseudo 2-D inversion scheme for multi component induction log data: 71st Annual25 International Meeting, SEG, Expanded Abstracts, 37638.
U.S. Appl. No. 11/676,936, filed Apr. 1, 2010, Office Action.
U.S. Appl. No. 11/676,936, filed Feb. 23, 2011, Office Action.
U.S. Appl. No. 11/676,936, filed Mar. 23, 2011, Notice of Allowance.
U.S. Appl. No. 12/695,834, filed Jan. 17, 2013, Office Action.
U.S. Appl. No. 12/695,834, filed Jul. 5, 2013, Notice of Allowance.
U.S. Appl. No. 12/879,399, filed Feb. 27, 2014, Office Action.
U.S. Appl. No. 13/183,680, filed Sep. 5, 2013, Notice of Allowance.
International Search Report of PCT/US2014/051253, mailed Feb. 12, 2015.

* cited by examiner

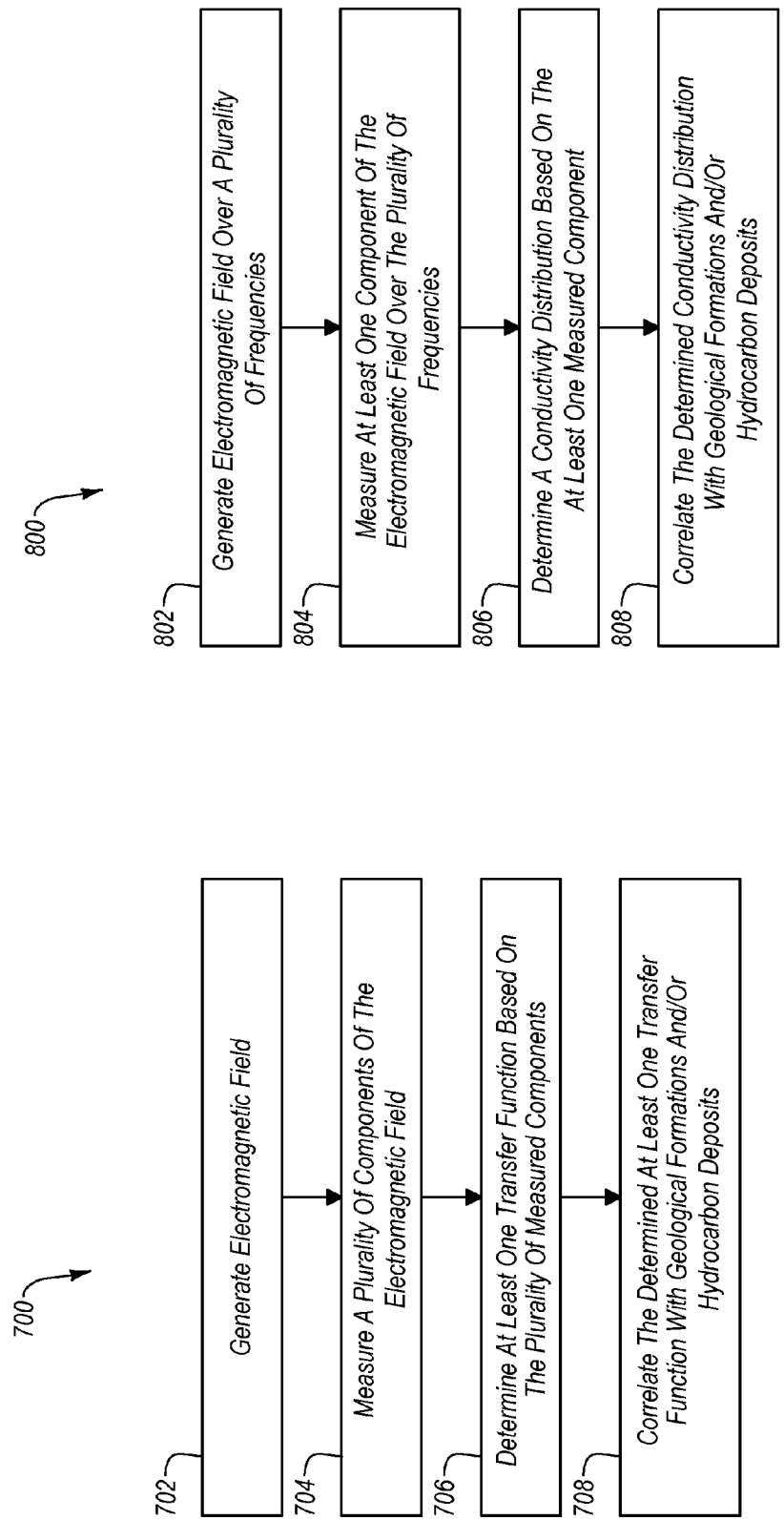

SYSTEMS AND METHODS FOR REMOTE ELECTROMAGNETIC EXPLORATION FOR MINERAL AND ENERGY RESOURCES USING STATIONARY LONG-RANGE TRANSMITTERS

CROSS-REFERENCE TO RELATED APPLICATIONS

This application is a continuation-in-part of U.S. patent application Ser. No. 12/695,834, filed Jan. 28, 2010, and entitled "Systems and Methods for Remote Electromagnetic Exploration for Mineral and Energy Resources," which claims the benefit of and priority to U.S. Provisional Patent Application Ser. No. 61/148,946, filed Jan. 31, 2009, and entitled "Systems and Methods for Remote Electromagnetic Exploration for Mineral Resources," and which '834 application is also a continuation-in-part of U.S. patent application Ser. No. 11/676,936, filed Feb. 20, 2007, and entitled "Systems and Methods for Measuring Sea-Bed Resistivity," which claims the benefit of U.S. Provisional Patent Application Ser. No. 60/868,905, filed Dec. 6, 2006, and entitled "Systems and Methods for Measuring Sea-Bed Resistivity," the disclosures of which are hereby incorporated by reference in their entireties.

BACKGROUND OF THE INVENTION

1. The Field of the Invention

The present disclosure relates generally to geophysical exploration. More specifically, the present invention relates to systems and methods for remote electromagnetic exploration for off-shore and land based mineral deposits, hydrocarbon reservoirs, and other energy resources.

2. The Related Technology

Traditionally, oil and gas exploration is conducted using the seismic method. This geophysical technique provides a reasonable geometrical image of the subsurface structures outlying the possible location and shape of the hydrocarbon deposit. However, the seismic method may experience difficulties in discriminating between the deposits filled with water and the deposits filled with oil or gas. At the same time, the electrical properties of the water and hydrocarbon filled deposits may differ dramatically because oil and gas generally have very high resistivity (up to about $10^8$ Ohm-m), while the water solutions in the rock formations are typically very conductive (about 1 Ohm-m and below).

Many existing electromagnetic technologies for marine and land oil and gas exploration are generally based on using either the magnetotelluric methods or placing the controlled source(s) in direct proximity to the target. There are very well known practical limitations of the controlled source electromagnetic (CSEM) methods related to the limited depth of investigation. In order to increase the depth of the electromagnetic field penetration, one should typically use large transmitter/receiver offsets and, correspondingly, a very powerful transmitter. Both of these requirements may increase the technological difficulties as well as the cost of the CSEM survey.

The magnetotelluric surveys are typically based on studying the electric and magnetic field variations in geologic formations surrounding a potential hydrocarbon deposit due to the source in the ionosphere/magnetosphere. The magnetotelluric field, because of its regional nature, is practically uniform in the horizontal direction and may generate relatively weak vertical currents. As a result, the magnetotelluric field generally has very limited sensitivity and resolution with respect to thin horizontal resistive targets that are typical for land and/or sea-bottom hydrocarbon deposits. Therefore a need exists for improved systems and methods for measuring geologic resistivity.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 7 is a flow diagram of another embodiment of a method for measuring resistivity of geologic formations;

FIG. 8 is a flow diagram of a further embodiment of a method for measuring resistivity of geologic formations;

DETAILED DESCRIPTION

Figure 2:
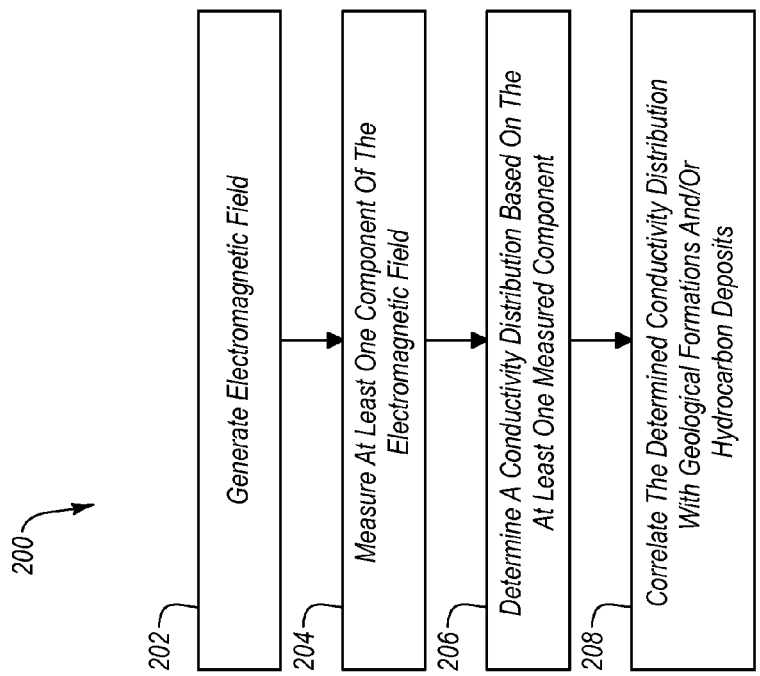
FIG. 2 is a flow diagram of an embodiment of a method for measuring resistivity of geologic formations.

A method of measuring the resistivity of rock formations for mineral and energy resources exploration with the goal for remote detection and imaging of the hydrocarbon deposits, utilizing ULF/ELF electromagnetic signals generated by the long-range or short-range transmitter located on the land, on the sea ice, and/or in the sea is described. Electromagnetic data may be acquired using an array of electric (galvanic) and/or magnetic (induction) receivers located on the land, on the sea ice, in the air, in the sea-water layer, and at the sea-bottom, and/or in the borehole to measure amplitude and phase of frequency or time domain responses in electric and magnetic fields of the ULF/ELF signals. The signals may be generated by the transmitter located on the land, on the sea ice, and/or in the sea. The corresponding electromagnetic transfer functions may be determined from the observed ULF/ELF signals by using the linear relationships between the different components of the electromagnetic fields. A 3D conductivity distribution in the geological formation may be determined using a 3D electromagnetic inversion technique. The obtained conductivity model may be correlated with known geological formations for sub-surface material characterization, remote detection and imaging of the hydrocarbon and other mineral deposits.

A method for measuring the resistivity of rock formations is described. An electromagnetic field is generated using at least one stationary long-range or short-range transmitter. The frequency of the electromagnetic field is between and/or including the ULF/ELF range. At least one component of the electromagnetic field is measured. A conductivity distribution is determined based on the at least one measured component. The determined conductivity distribution is correlated with geological formations and/or hydrocarbon deposits.

In some embodiments, generating an electromagnetic field includes generating the electromagnetic field over a plurality of frequencies. In other embodiments, generating an electromagnetic field includes generating the electromagnetic field in the time domain. In further embodiments, generating the electromagnetic field in the time domain includes using a magnetohydrodynamic (MHD) generator. In some embodiments, measuring at least one component of the electromagnetic field includes using a receiver that measures the electromagnetic field over a plurality of frequencies. In other embodiments, measuring at least one component of the electromagnetic field includes using a receiver that measures the electromagnetic field in the time domain.

Generating an electromagnetic field, in some embodiments, includes locating a transmitter on land, on the sea ice, or underwater. In further embodiments, the transmitter is an undersea communication cable. In still further embodiments, the transmitter may be located underground, under the sea ice, partially underground, or partially under the sea ice.

In some embodiments, the electromagnetic field is generated by a transmitter formed by a system of grounded electric bipoles of several kilometers in length or formed by a loop of wire with the radius of several kilometers. For example, the length and/or radius of the transmitter may be more than about three kilometers. In further embodiments, measuring at least one component of the electromagnetic field further comprises using at least one galvanic receiver and/or at least one induction receiver. In still further embodiments, the voltage detected in at least one of the receivers is recorded.

Measuring at least one component of the electromagnetic field, in some embodiments, includes measuring the amplitude and/or phase of the electromagnetic field. In further embodiments, measuring at least one component of the electromagnetic field includes using at least one receiver located on a sea-bed, and/or at least one receiver located in a borehole, and/or at least one receiver located on land, and/or at least one receiver located in the air, and/or at least one receiver located within the sea-water layer, and/or at least one receiver located on the sea ice.

In some embodiments, measuring at least one component of the electromagnetic field includes using at least one moving receiver. In further embodiments, measuring at least one component of the electromagnetic field includes using at least one moving receiver located underwater. In still further embodiments, measuring at least one component of the electromagnetic field includes using at least one airborne receiver. In yet further embodiments, measuring at least one component of the electromagnetic field includes using a receiver that measures a magnetic component and/or electric component of the electromagnetic field. In some embodiments, the receiver may be operatively associated with a survey vehicle, such as fixed wing airplanes, propeller airplanes, jet propelled airplanes, unmanned aerial vehicles, other vehicles, or combinations thereof. In other embodiments, the receiver may be operatively associated with an underwater survey vehicle, such as submarines, autonomous underwater vehicles, remotely operated underwater vehicles, other vehicles, or combinations thereof.

Determining a conductivity distribution, in some embodiments, is based on a plurality of measured components of the electromagnetic field and the conductivity distribution is determined by determining at least one transfer function using the plurality of measured components of the electromagnetic field. In further embodiments, determining at least one transfer function includes determining at least one electric transfer function, magnetic transfer function, impedance transfer function and/or admittance transfer function.

In some embodiments, determining at least one transfer function includes using a linear relationship between a first component of the electromagnetic field and a second component of the electromagnetic field. In further embodiments, determining at least one transfer function includes using a least-squares method.

Correlating the determined conductivity distribution with geological formations and/or hydrocarbon deposits, in some embodiments, includes characterizing subsurface material, remotely detecting hydrocarbon deposits and/or imaging the hydrocarbon deposits.

In some embodiments, correlating the determined conductivity distribution with geological formations and/or hydrocarbon deposits includes determining a three-dimensional conductivity distribution. In further embodiments, determining a three-dimensional conductivity distribution includes using a three-dimensional inversion technique. In still further embodiments, the three-dimensional inversion technique is based on a regularized three-dimensional focusing nonlinear inversion of the at least one measured component of the electromagnetic field.

Correlating the determined conductivity distribution with geological formations and/or hydrocarbon deposits, in some embodiments, includes comparing observed data with predicted data. In further embodiments, comparing observed data with predicted data includes minimizing a parametric functional. In still further embodiments, minimizing a parametric functional includes using gradient type methods and/or a misfit functional and a stabilizer.

In some embodiments, correlating the determined conductivity distribution with geological formations and/or hydrocarbon deposits includes stacking the measured at least one component of the electromagnetic field with a corresponding at least one component of the electromagnetic field measured at another period.

Another embodiment of a method for locating hydrocarbon deposits is described. An electromagnetic field is generated using at least one stationary long-range or short-range transmitter. The frequency of the electromagnetic field is between and/or including the ULF/ELF range. At least one component of the electromagnetic field is measured using a plurality of receivers. At least one transfer function is determined based on the at least one measured component. The determined transfer function is correlated with geological formations and/or hydrocarbon deposits.

A further embodiment of a method for locating hydrocarbon deposits is described. An electromagnetic field is generated using at least one undersea communication cable carrying a frequency domain current. The frequency of the electromagnetic field is within the ULF/ELF range. A plurality of components of the electromagnetic field are measured using a plurality of magnetic and/or electric receivers that are located at the sea-bottom, wherein the plurality of receivers measure the electromagnetic field over a plurality of frequencies. At least one transfer function is determined based on the plurality of measured components. At least one of the following transfer functions is an electric transfer function, a magnetic transfer function, an impedance transfer function and/or an admittance transfer function. The determined at least one transfer function is correlated with geological formations and/or hydrocarbon deposits by determining a three-dimensional conductivity distribution using a three-dimensional inversion technique based on a regularized three-dimensional focusing nonlinear inversion of the plurality of measured components of the electromagnetic field. Observed data is compared with predicted data by minimizing a parametric functional using gradient type methods and/or a misfit functional and a stabilizer. The plurality of measured components of the electromagnetic field are stacked with a corresponding plurality of measured components of the electromagnetic field measured at another period.

Various embodiments of the invention are now described with reference to the Figures. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments of the disclosed invention(s)," unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on", unless expressly specified otherwise. In other words, the phrase "based on" describes both "based only on" and "based at least on."

It would be an advantage over existing magnetotelluric and controlled source electromagnetic (CSEM) techniques to provide a system and a method for direct deposit imaging and quantitative evaluation of its geoelectrical parameters utilizing the ultra low and extremely low frequency (ULF and ELF) radio communication signal in the range of about 0.01 Hz to about 30 Hz, which may penetrate deep enough to reach a hydrocarbon deposit. ULF and ELF signals may provide nearly worldwide coverage, which make them an attractive and reliable source for practical geophysical exploration. The ULF/ELF radio communication system may also be characterized by an extremely narrow and stable frequency range with a very narrow frequency shift, which may allow for stacking the recorded signal to improve the signal-to-noise ratio.

Undersea communication cables may represent another type of low frequency transmitting system. The network of submarine cables generally covers wide areas of the world ocean providing a practically free source of transmitting electromagnetic energy, which can be efficiently used for geophysical exploration as well.

The systems and methods disclosed herein may be used for subsurface resistivity imaging of the hydrocarbon deposits using the ULF/ELF electromagnetic signals of a powerful electromagnetic transmitter, which may be located on land, on the sea ice, and/or at the sea-bottom. A geophysical method of hydrocarbon exploration using undersea communication cables as a source of the ULF/ELF electromagnetic signals is also described. A method and numerical scheme for quantitative interpretation of the ULF/ELF field measured on land, on the sea ice, in the air, in the borehole, within the sea-water layer, and at the sea-bottom is described. Although the examples provided herein are generally directed to resistivity imaging of hydrocarbon deposits, other uses are also contemplated. Furthermore, although detection of hydrocarbon deposits is described, mapping of other types of mineral deposits, a combination of the two and/or other uses may also be contemplated.

Systems and methods for measuring the resistivity of the rock and ice formations and imaging a hydrocarbon deposit using the ULF/ELF signal of the electromagnetic transmitter is provided. The methods may include measuring the magnetic and electric fields generated by a stationary transmitter operating in the ULF/ELF range (on the order of about 0.01 Hz to about 30 Hz). A stationary transmitter may be located on the land, on the sea ice, or at the sea-bottom. The measurements may be conducted by an array of receivers located on land, on the sea ice, at some elevation in the air, at some depth within the sea-water layer, and/or at the sea-bottom, and/or in the borehole at a large distance (for example, from about a few kilometers up to about a thousand kilometers) from the transmitter.

The transmitter location may be selected either on the land in the area with the outcropping resistive earth crust basement, on the sea ice, or directly at the sea-bottom, in order to ensure that the electromagnetic field generated by the transmitter propagates along two propagation paths of low frequency waves: the first path may be formed by the earth-ionospheric wave guide and the second path may be represented by the underground wave guide formed by the resistive thickness of the earth crust. As a result, the resistivity distribution of earth formations penetrated by the ULF/ELF electromagnetic field may be determined by taking into account both the electromagnetic signals arriving at the receivers by the earth-ionospheric wave guide and by the underground wave guide formed by the resistive thickness of the earth crust. Therefore, the method may be used even in the deep-water settings, where both the natural magnetotelluric field and the part of the ULF/ELF signal propagating from the ionosphere typically cannot penetrate through the thick conductive layer of the sea water.

The systems and methods may be used for direct deposit imaging and quantitative evaluation of its geoelectrical parameters utilizing the ultra low and extremely low frequency (ULF and ELF) electromagnetic signals in the range of about 0.01 Hz to about 30 Hz, which may penetrate deep enough within the geological formations to reach the hydrocarbon deposit. In the present embodiment, signals may range in frequency from about 0.01 Hz to about 30 Hz.

In one embodiment of the invention the measurements may be conducted by an array of fixed electric and/or magnetic receivers located on the land, on the sea ice, or at the sea-bottom. One receiver position may be selected as a reference position (the reference station). The corresponding transfer functions between the electromagnetic data in the reference station position and in the array of receivers may be calculated. These transfer functions may be independent of the configuration and location of the transmitter and they may only depend on the resistivity distribution in the geological formations. The quantitative interpretation of the observed data and imaging of the hydrocarbon deposit may be based on the analysis of the corresponding electromagnetic transfer functions.

In an alternative embodiment of the invention, the measurements may be conducted by the sets of moving and fixed electric and/or magnetic receivers and the corresponding transfer functions may be calculated between the moving set of the receivers and the fixed set of the receivers.

In another embodiment of the invention, the frequency domain current in the transmitter may be generated for at least several frequencies, and the receivers may measure the signal at several frequencies. The multi-frequency measurements may be used for frequency electromagnetic sounding of the medium at the receiver locations, using both the electromagnetic signals arriving at the receivers by the earth-ionospheric wave guide and by the underground wave guide formed by the resistive thickness of the earth crust.

Yet another embodiment of the invention may provide a new electromagnetic system and method for determining the resistivity image of a hydrocarbon deposit using the ULF/ELF signal of the remote electromagnetic transmitter in the time domain. The time domain measurements may be used for transient electromagnetic sounding of the medium at the receiver locations, using both the electromagnetic signals arriving at the receivers by the earth-ionospheric wave guide and by using the underground wave guide formed by the resistive thickness of the earth crust.

In another embodiment, the time domain current in the transmitter located on the land, on the sea ice, or at the sea-bottom may be generated with the powerful pulse magneto hydrodynamic (MHD) generator.

The electromagnetic field generated by remote transmitter at the ultra low or extremely low (ULF/ELF) frequency may be utilized for the resistivity imaging of the off-shore hydrocarbon deposits.

In the illustrated embodiments, two major types of transmitting facilities may be used generally in order to effectively utilize the electromagnetic field propagating to the receivers through the underground wave guide formed by the resistive thickness of the earth crust: (1) a stationary transmitter may be located on the land or on the sea ice, preferably, in the area with the outcropping resistive earth crust basement and the electromagnetic transmitter may be formed by a system of grounded electric bipoles with several kilometers length (up to about 100 kilometers), and/or by a horizontal electric loop of wire with the radius of several kilometers, and (2) a stationary transmitter may be located at the sea-bottom and may be formed by a long undersea communication cable carrying a frequency domain electric current. In other embodiments, other types of transmitting facilities may be used to utilize the electromagnetic field propagating through the underground wave guide formed by the earth's crust.

Some embodiments may provide a new capability for determining the resistivity distribution of earth formations penetrated by the ULF/ELF electromagnetic field by taking into account both the electromagnetic signals arriving at the receivers by the earth-ionospheric wave guide and by the underground wave guide formed by the resistive thickness of the earth's crust. In order to enhance this capability, the transmitting facility on the land may be formed by the grounded electric bipole(s) sending the current into the earth's formations. The transmitting facility on the sea ice may also be formed by the grounded electric bipole(s) sending the current into the sea water under the ice pack through the wells drilled through the ice's formations. In the case of the undersea electric cable transmitter, the main part of the generated electromagnetic field may also propagate through the undersea formations, especially in the deep ocean areas.

Figure 1:
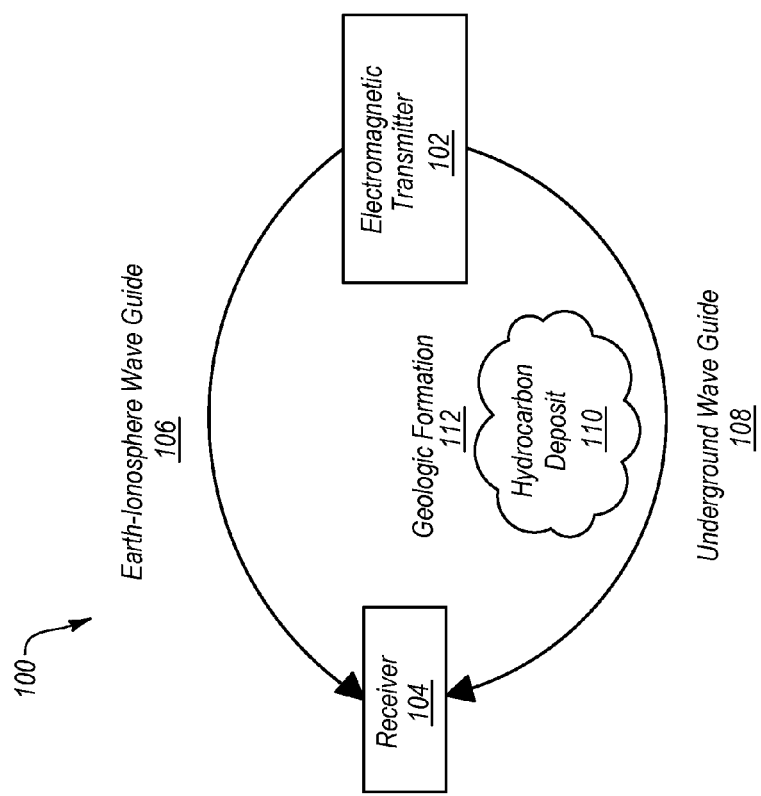
FIG. 1 is a conceptual block diagram illustrating an embodiment of a system for measuring resistivity of geologic formations.

FIG. 1 is a conceptual block diagram illustrating an embodiment of a system 100 for measuring resistivity of geologic formations. The system 100 may include an electromagnetic transmitter 102 and a receiver 104. The electromagnetic transmitter 102 may generate an electromagnetic field.

The generated electromagnetic field may be propagated through the earth-ionospheric wave guide 106 and/or the underground wave guide 108 formed within the earth's crust. The generated electromagnetic field may reach the receiver 104. The receiver 104 may be used to measure at least one component of the electromagnetic field.

A hydrocarbon deposit 110 may be located within the geologic formation 112. For example, the geologic formation 112 may include rock formations with a known conductivity distribution.

FIG. 2 is a flow diagram of an embodiment of a method 200 for measuring resistivity of geologic formations. The method 200 may include generating 202 an electromagnetic field. The electromagnetic field may be generated 202 by an electromagnetic transmitter 102.

At least one component of the electromagnetic field may be measured 204. At least one receiver 104 may measure 204 the electromagnetic field. For example, at least one receiver 104 may measure 204 at least one component of the electromagnetic field. In some embodiments, the amplitude and/or phase of the electromagnetic field may be measured 204. In further embodiments, the magnetic and/or electric components of the electromagnetic field may be measured 204.

A conductivity distribution may be determined 206 based on the at least one measured component. The conductivity distribution may include the conductivity distribution for a hydrocarbon deposit 110, geological formations, and/or other formations and/or deposits. The determined conductivity distribution may be correlated 208 with geological formations and/or hydrocarbon deposits 110.

Figure 3:
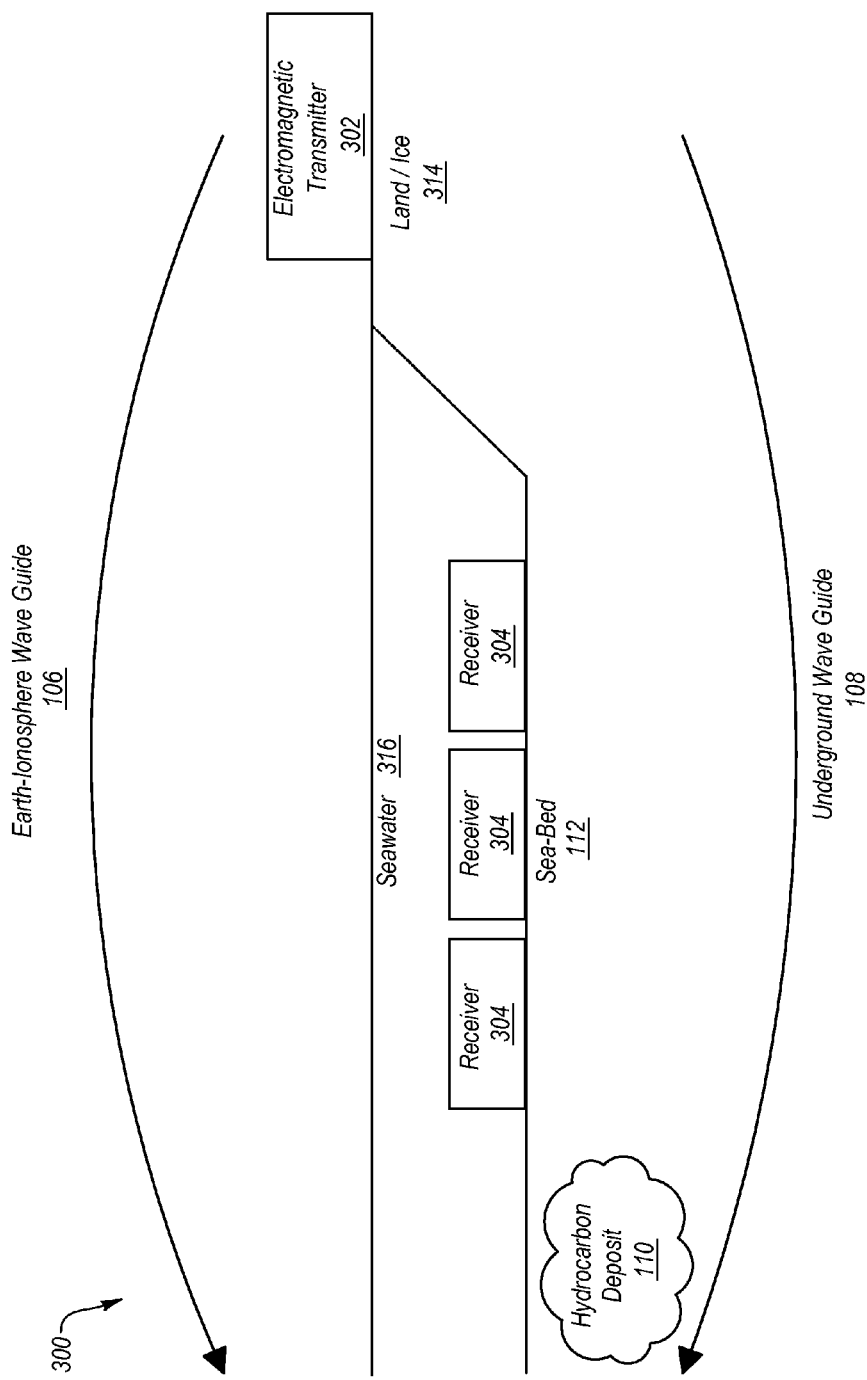
FIG. 3 is a conceptual block diagram illustrating another embodiment of a system for measuring sea-bed resistivity.

FIG. 3 is a conceptual block diagram illustrating another embodiment of a system 300 for measuring sea-bed resistivity. The system 300 may include an electromagnetic transmitter 302 and at least one receiver 304.

The electromagnetic transmitter 302 may be located on land or the sea ice 314. The electromagnetic transmitter 302 may be a stationary long-range or short-range transmitter. In the present embodiment, the electromagnetic transmitter 302 may be a system of grounded electric bipoles. The system of grounded electric bipoles may be more than three kilometers in length. In other embodiments, the electromagnetic transmitter 302 may be a loop of wire. The loop of wire may have a radius of more than three kilometers.

The at least one receiver 304 may be located in the seawater 316. In other embodiments, the receivers 304 may be located in freshwater, etc. The receivers 304 may be located on a sea-bed 112. In other embodiments, the receivers 304 may be located in a borehole. For example, the receivers 304 may be located in a borehole in the sea-bed 112. In the present embodiment, the receivers 304 may be stationary.

In the present embodiment, three receivers 304 may be used. In other embodiments, more or fewer receivers 304 may be used. In some embodiments, the system 300 may be a ULF/ELF sea-bed electromagnetic (USBEM) survey configuration using one on land electromagnetic transmitter 302 and an array of fixed sea-bottom receivers 304 of electric and/or magnetic fields.

The electromagnetic transmitter 302 may generate an electromagnetic field. In the present embodiment, the frequency of the electromagnetic field may be between and/or including the ELF and ULF range. In other embodiments, the frequency of the electromagnetic field may be in another range. For example, the frequency may be in the ELF, SLF, ULF and/or another frequency range. The frequency range may be selected based on whether the frequency range may propagate through the earth-ionospheric wave guide 106 and/or the underground wave guide 108 formed within the earth's crust.

The generated electromagnetic field may be propagated through the earth-ionospheric wave guide 106 and/or the underground wave guide 108 formed within the earth's crust. The generated electromagnetic field may reach the receivers 304.

The receivers 304 may be used to measure at least one component of the electromagnetic field. The receivers 304 may be galvanic, induction and/or other receiver types. At least one receiver 304 may record voltage detected by the at least one receiver 304. The receivers 304 may measure at least one component of the electromagnetic field. For example, the receivers 304 may measure the amplitude and/or phase of the electromagnetic field. In another example, the receivers 304 may measure magnetic and/or electric components of the electromagnetic field.

A hydrocarbon deposit 110 may be located within the sea-bed 112. For example, the sea-bed 112 may include geological formations with a known conductivity distribution.

Figure 4:
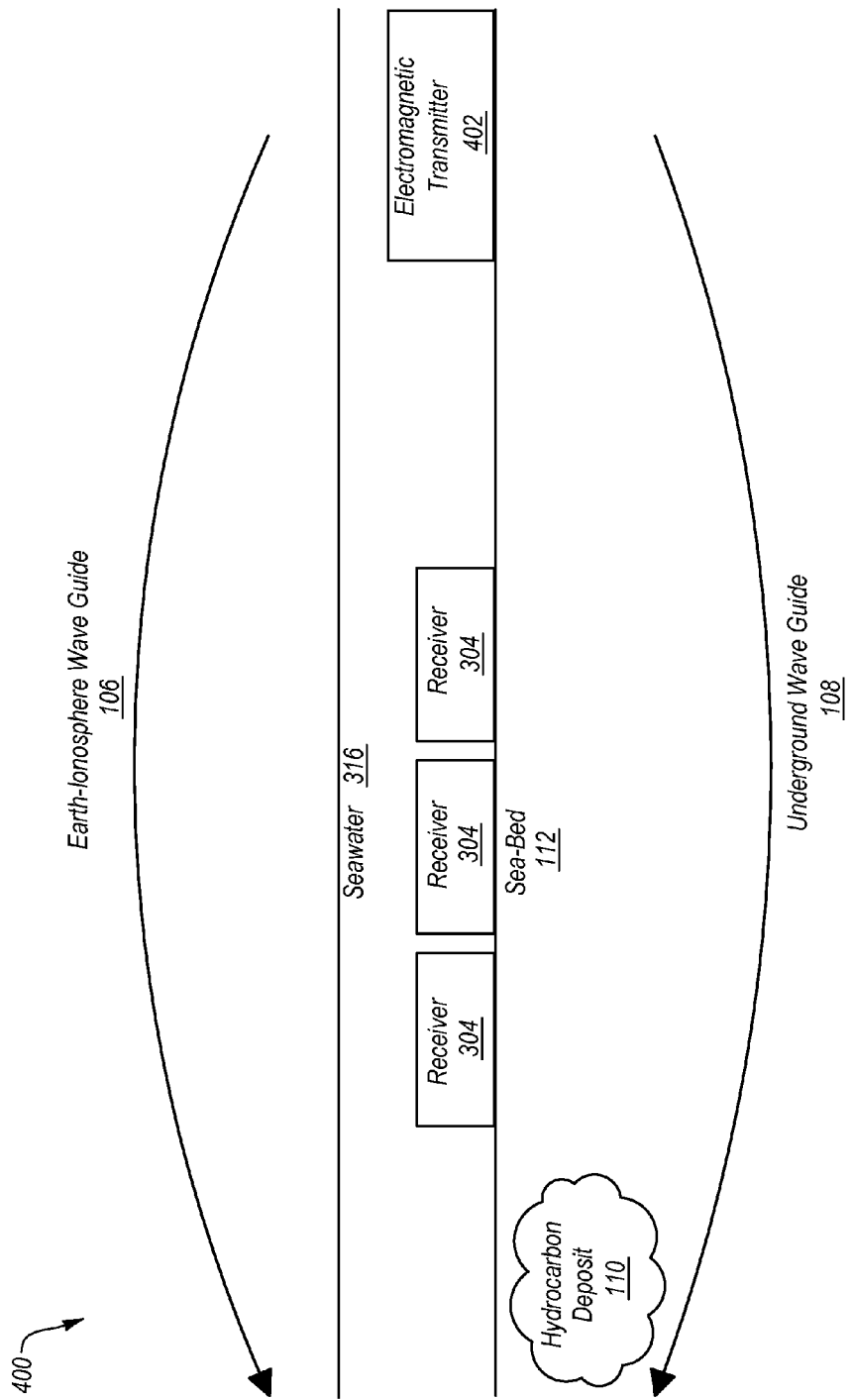
FIG. 4 is a conceptual block diagram illustrating a further embodiment of a system for measuring sea-bed resistivity.

FIG. 4 is a conceptual block diagram illustrating a further embodiment of a system 400 for measuring sea-bed resistivity. The system 400 may include an electromagnetic transmitter 402 and at least one receiver 304.

The electromagnetic transmitter 402 may be located in the seawater 316. The electromagnetic transmitter 402 may be an undersea communication cable. The electromagnetic transmitter 402 may be located on a sea-bed 112. In the present embodiment, the electromagnetic transmitter 402 is located at the sea bottom.

The at least one receiver 304 may be located in the seawater 316. In other embodiments, the receivers 304 may be located in freshwater, etc. The receivers 304 may be located on a sea-bed 112. In other embodiments, the receivers 304 may be located in a borehole. For example, the receivers 304 may be located in a borehole at the sea bottom.

In the present embodiment, three receivers 304 may be used. In other embodiments, more or fewer receivers 304 may be used. In some embodiments, the system 400 may be a ULF/ELF sea-bed electromagnetic (USBEM) survey configuration using a submarine cable electromagnetic transmitter 402 and an array of fixed sea-bottom receivers 304 of electric and/or magnetic fields.

The electromagnetic transmitter 402 may generate an electromagnetic field. In the present embodiment, the frequency of the electromagnetic field may be between and/or including the ELF and ULF range. In other embodiments, the frequency of the electromagnetic field may be in another range. For example, the frequency may be in the ELF, SLF, ULF and/or another frequency range. The frequency range may be selected based on whether the frequency range may propagate through the earth-ionospheric wave guide 106 and/or the underground wave guide 108 formed within the earth's crust.

The generated electromagnetic field may be propagated through the earth-ionospheric wave guide 106 and/or the underground wave guide 108 formed within the earth's crust. The generated electromagnetic field may reach the receivers 304.

The receivers 304 may be used to measure at least one component of the electromagnetic field. The receivers 304 may be galvanic, induction and/or other receiver types. At least one receiver 304 may record voltage detected by the at least one receiver 304. The receivers 304 may measure at least one component of the electromagnetic field. For example, the receivers 304 may measure the amplitude and/or phase of the electromagnetic field. In another example, the receivers 304 may measure a magnetic, electric and/or other component of the electromagnetic field.

A hydrocarbon deposit 110 may be located within the sea-bed 112. For example, the sea-bed 112 may include geological formations with a known conductivity distribution.

Figure 5:
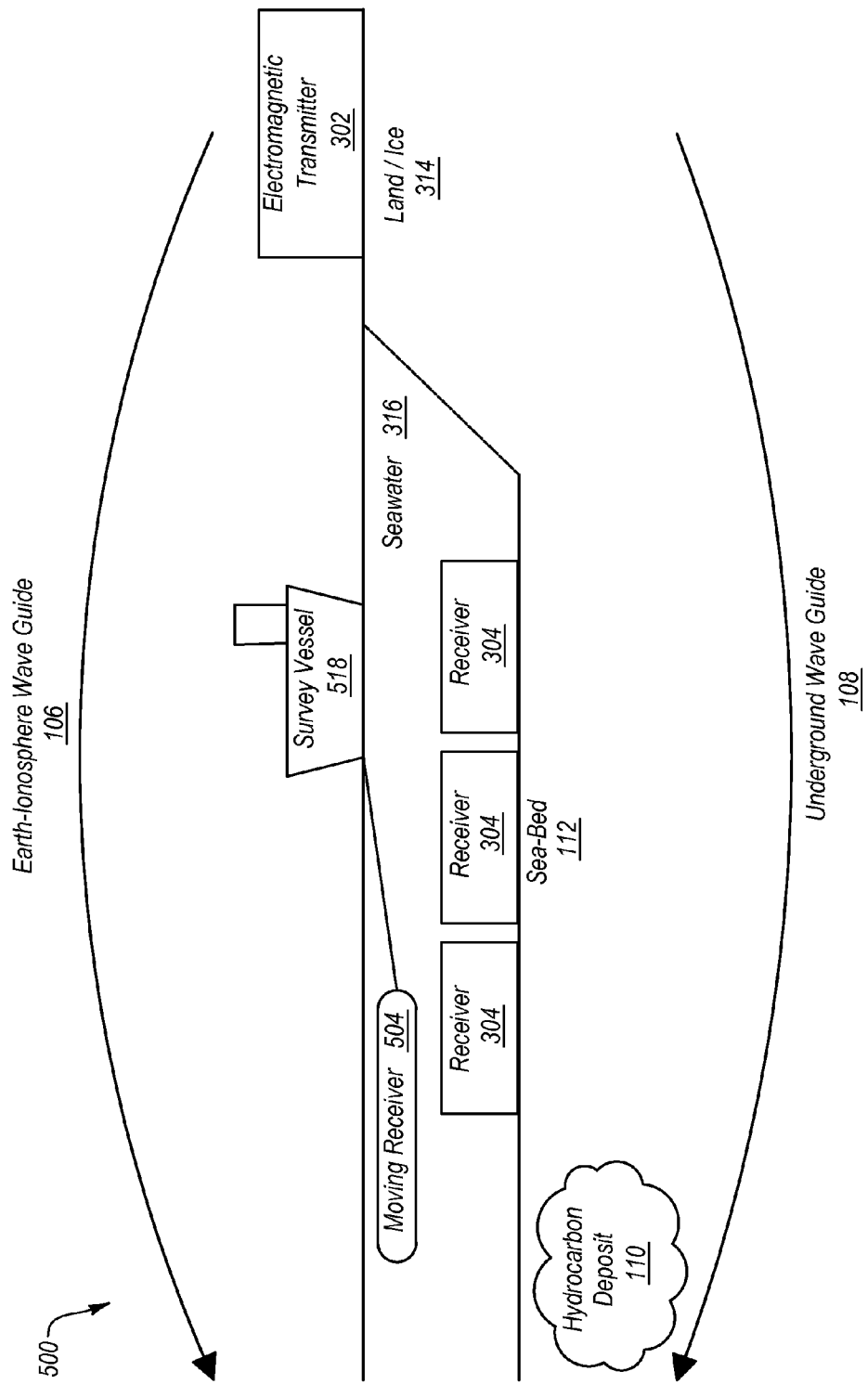
FIG. 5 is a conceptual block diagram illustrating a still further embodiment of a system for measuring sea-bed resistivity.

FIG. 5 is a conceptual block diagram illustrating a still further embodiment of a system 500 for measuring sea-bed resistivity. The system 500 may include an electromagnetic transmitter 302 and at least one receiver 304.

The electromagnetic transmitter 302 may be located on land or the sea ice 314. The electromagnetic transmitter 302 may be a stationary long-range transmitter. In the present embodiment, the electromagnetic transmitter 302 may be a system of grounded electric bipoles. The system of grounded electric bipoles may be several kilometers in length. For example, the system of grounded bipoles may be more than three kilometers in length. In other embodiments, the electromagnetic transmitter 302 may be a loop of wire. The loop of wire may have a radius of more than several kilometers. For example, the loop of wire may have a radius of more than three kilometers.

The receivers 304 may be located in the seawater 316. In other embodiments, the receivers 304 may be located in freshwater, etc. The receivers 304 may be located on a sea-bed 112. In other embodiments, the receivers 304 may be located in a borehole. For example, the receivers 304 may be located in a borehole at the sea bottom. In the present embodiment, the system 400 may include at least one receiver 304 located on a sea-bed 112 and/or at least one moving receiver 504. The at least one moving receiver 504 may be towed by a survey vessel 518. In the present embodiment, only one moving receiver 504 is illustrated. In other embodiments, multiple moving receivers 504 may be used. In some embodiments, the system 500 may be a USBEM survey configuration using an on land electromagnetic transmitter 302, a set of fixed sea-bottom receivers 304, and another set of moving receivers 504 of electric and/or magnetic fields, towed by a survey vessel 518.

In some embodiments, the moving receiver 504 may be may be operatively associated with other survey craft and/or other vehicles. Survey craft may include fixed wing airplanes, propeller airplanes, jet propelled airplanes, unmanned aerial vehicles, other vehicles, or combinations thereof. The receiver 504 may be an airborne receiver. For example, a receiver 504 may be located above the outer surface of the earth. In a further example, a receiver 504 may be located substantially above the outer surface of the earth. In other embodiments, the receiver may be operatively associated with an underwater survey vehicle, such as submarines, autonomous underwater vehicles, remotely operated underwater vehicles, other vehicles, or combinations thereof.

In further embodiments, the transmitter may be located in the close proximity to the prospective hydrocarbon deposit. The moving receiver operatively associated with the survey craft, airborne survey craft, other vehicles, or combinations thereof, may be located in the area directly above the prospective hydrocarbon deposit. The measurements can be used for a detection and characterization of the hydrocarbon reservoir.

In yet further embodiments, the transmitter may be located in the close proximity of the prospective hydrocarbon deposit. The moving receiver operatively associated with the survey craft, airborne survey craft, underwater survey vehicle, and/or other vehicles, may be located in the area directly above the prospective hydrocarbon deposit. The measurements of the EM field by the receiver can be conducted repeatedly over a relatively short (several days/weeks) or relatively long (months, years) period of time. The time-lapse EM measurements may be used for characterization and monitoring the flow of oil and gas from the hydrocarbon reservoirs as they deplete.

Multiple receivers 504 may be used. For example, one receiver (such as receiver 1304 shown in FIG. 13) may be operatively associated with an airborne survey craft (such as survey craft 1318 shown in FIG. 13), another receiver (such as receiver 1404 shown in FIG. 14) may be operatively associated with an underwater survey vehicle (such as survey vehicle 1418 shown in FIG. 14), and another receiver 504 may be operatively associated with a survey vessel 518. In some embodiments using a receiver operatively associated with an airborne survey craft, the electromagnetic field may attenuate as the height of the receiver approaches the skin depths of the water. It may be desirable to use a receiver operatively associated with an airborne survey craft for measurements above about 600 meters. For instance, a receiver operatively associated with an airborne survey craft may be used between the surface of the water and about 600 meters, between the surface of the water and about 300 meters, and between about 300 meters and about 600 meters.

The electromagnetic transmitter 302 may generate an electromagnetic field. In the present embodiment, the frequency of the electromagnetic field may be between and/or including the ELF and ULF range. In other embodiments, the frequency of the electromagnetic field may be in another range. For example, the frequency may be in the ELF, SLF, ULF and/or another frequency range.

The generated electromagnetic field may be propagated through the earth-ionospheric wave guide 106 and/or the underground wave guide 108 formed within the earth's crust. The generated electromagnetic field may reach the receivers 304, 504.

The receivers 304, 504 may be used to measure at least one component of the electromagnetic field. The receivers 304, 504 may be galvanic, induction and/or other receiver types. At least one receiver 304, 504 may record voltage detected by the at least one receiver 304, 504. The receivers 304, 504 may measure at least one component of the electromagnetic field. For example, the receivers 304, 504 may measure the amplitude and/or phase of the electromagnetic field. In another example, the receivers 304, 504 may measure a magnetic, electric and/or other component of the electromagnetic field.

A hydrocarbon deposit 110 may be located within the sea-bed 112. For example, the sea-bed 112 may include geological formations with a known conductivity distribution.

Figure 6:
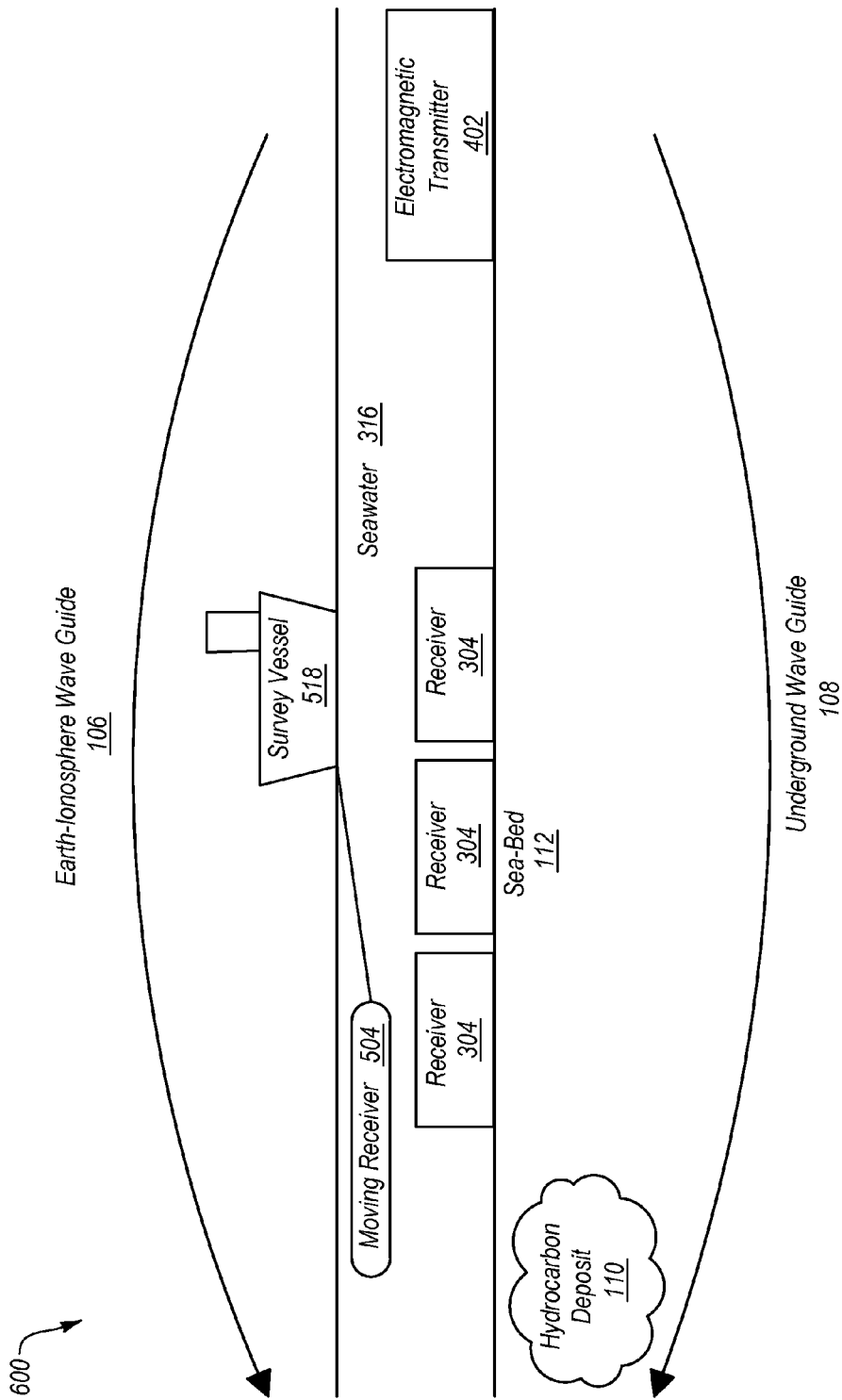
FIG. 6 is a conceptual block diagram illustrating a further embodiment of a system for measuring sea-bed resistivity.

FIG. 6 is a conceptual block diagram illustrating a further embodiment of a system 600 for measuring sea-bed resistivity. The system 600 may include an electromagnetic transmitter 402 and at least one receiver 304, 504.

The electromagnetic transmitter 402 may be located in the seawater 316. The electromagnetic transmitter 402 may be an undersea communication cable. The electromagnetic transmitter 402 may be located on a sea-bed 112. In the present embodiment, the electromagnetic transmitter 402 is located at the sea bottom.

The receivers 304, 504 may be located in the seawater 316. In other embodiments, the receivers 304, 504 may be located in freshwater, etc. Some of the receivers 304 may be located on a sea-bed 112. In other embodiments, some of the receivers 304 may be located in a borehole. For example, the receivers 304 may be located in a borehole in the sea-bed 112. In the present embodiment, the system 400 may include at least one receiver 304 located on a sea-bed 112 and/or at least one moving receiver 504. The at least one moving receiver 504 may be towed by a survey vessel 518. In the present embodiment, only one moving receiver 504 is illustrated. In other embodiments, multiple moving receivers 504 may be used. In some embodiments, the system 600 may be a USBEM survey configuration using a submarine cable electromagnetic transmitter 402, a set of fixed sea-bottom receivers 304, and another set of moving receivers 504 of electric and/or magnetic fields, towed by the survey vessel 518.

The electromagnetic transmitter 402 may generate an electromagnetic field. In the present embodiment, the frequency of the electromagnetic field may be between and/or including the ELF and ULF range. In other embodiments, the frequency of the electromagnetic field may be in another range. For example, the frequency may be in the ELF, SLF, ULF and/or another frequency range. The frequency range may be selected based on whether the frequency range may propagate through the earth-ionospheric wave guide 106 and/or the underground wave guide 108 formed within the earth's crust.

The generated electromagnetic field may be propagated through the earth-ionospheric wave guide 106 and/or the underground wave guide 108 formed within the earth's crust. The generated electromagnetic field may reach the receivers 304, 504.

The receivers 304, 504 may be used to measure at least one component of the electromagnetic field. The receivers 304, 504 may be galvanic, induction and/or other receiver types. At least one receiver 304, 504 may record voltage detected by the at least one receiver 304, 504. The receivers 304, 504 may measure at least one component of the electromagnetic field. For example, the receivers 304, 504 may measure the amplitude and/or phase of the electromagnetic field. In another example, the receivers 304, 504 may measure a magnetic, electric and/or other component of the electromagnetic field.

In some embodiments, the moving receiver 504 may be operatively associated with other survey craft and/or other vehicles. Survey craft may include fixed wing airplanes, propeller airplanes, jet propelled airplanes, unmanned aerial vehicles, other vehicles, or combinations thereof. The receiver 504 may be an airborne receiver. For example, a receiver 504 may be located above the area of the prospective hydrocarbon reservoir location. In a further example, a receiver 504 may be located substantially above the outer surface of the earth. In other embodiments, the receiver may be operatively associated with an underwater survey vehicle, such as submarines, autonomous underwater vehicles, remotely operated underwater vehicles, other vehicles, or combinations thereof.

Multiple receivers 504 may be used. For example, one receiver (such as receiver 1304 shown in FIG. 13) may be operatively associated with an airborne survey craft (such as survey craft 1318 shown in FIG. 13), another receiver (such as receiver 1404 shown in FIG. 14) may be operatively associated with an underwater survey vehicle (such as survey vehicle 1418 shown in FIG. 14), and another receiver 504 may be operatively associated with a survey vessel 518.

A hydrocarbon deposit 110 may be located within the sea-bed 112. For example, the sea-bed 112 may include geological formations with a known conductivity distribution.

FIG. 7 is a flow diagram of an embodiment of a method 700 for measuring resistivity of geologic formations. The method 700 may include generating 702 an electromagnetic field. The electromagnetic field may be generated 702 by an electromagnetic transmitter 102. The electromagnetic transmitter 102 may be located on land or the sea ice, like the electromagnetic transmitter 302 described in FIGS. 3, 5, 14, and 16 or underwater, like the electromagnetic transmitter 402 described in FIGS. 4, 6, 15, and 17.

A plurality of components of the electromagnetic field may be measured 704. Receivers 104 may measure 704 the plurality of components of the electromagnetic field. In some embodiments, one receiver 104 may be used to measure 704 a plurality of components of the electromagnetic field. For example, one receiver 104 may measure 704 the x and the y component of the electrical field. In other embodiments, a plurality of receivers 104 may be used to measure 704 a plurality of components of the electromagnetic field. For example, two receivers 104 may measure 704 the x component of the magnetic field. Other directional components of the electric and/or magnetic portion of the electromagnetic field may be measured 704 by one or more receivers 104.

At least one transfer function may be determined 706. The transfer function may be determined based on the plurality of measured components of the electromagnetic field. The determined at least one transfer function may be correlated 708 with geological formations and/or hydrocarbon deposits 110.

For example, at least one receiver 104 may be located at a point with a radius vector $r_0$ of some Cartesian coordinates and at least one other receiver 104 may be located at a point with a variable radius vector r. The receivers 104 may measure 704 any combination of the components of the electromagnetic field: $\{E_x, E_y, E_z, H_x, H_y, H_z\}$. The electromagnetic field components observed in point r are linearly proportional to the electromagnetic field components observed in the reference point $r_0$ $$E_\alpha(r) = \sum_{\beta=x,y,z} T_{\alpha\beta}(r, r_0) E_\beta(r_0), \tag{1}$$

$$H_\alpha(r) = \sum_{\beta=x,y,z} M_{\alpha\beta}(r, r_0) H_\beta(r_0), \tag{2}$$

$$E_\alpha(r) = \sum_{\beta=x,y,z} Z_{\alpha\beta}(r, r_0) H_\beta(r_0), \tag{3}$$

$$H_\alpha(r) = \sum_{\beta=x,y,z} Y_{\alpha\beta}(r, r_0) E_\beta(r_0), \alpha = x, y, z, \tag{4}$$

where $T_{\alpha\beta}$, $M_{\alpha\beta}$, $Z_{\alpha\beta}$ and $Y_{\alpha\beta}$ are scalar electromagnetic transfer functions. $T_{\alpha\beta}$ and $M_{\alpha\beta}$ are electric and magnetic transfer functions, while $Z_{\alpha\beta}$ and $Y_{\alpha\beta}$ are impedance and admittance transfer functions, respectively. In the present embodiment, at least one transfer function may be determined 706 based on the plurality of measured components of the electromagnetic field.

The transfer functions $T_{\alpha\beta}$, $M_{\alpha\beta}$, $Z_{\alpha\beta}$, and $Y_{\alpha\beta}$ depend on the coordinates of the observation points, r and $r_0$, the frequency, $\omega$, and/or the distribution of electrical conductivity in the medium, $\sigma(r)$. However, the transfer functions $T_{\alpha\beta}$, $M_{\alpha\beta}$, $Z_{\alpha\beta}$, and $Y_{\alpha\beta}$ are independent of the strength and configuration of the current in the transmitter 102. The transfer functions $T_{\alpha\beta}$, $M_{\alpha\beta}$, $Z_{\alpha\beta}$, and $Y_{\alpha\beta}$, in contrast to measured electric and magnetic fields, carry information about the internal geoelectrical structure of the earth only. In other embodiments, other transfer functions may include transfer functions other than the $T_{\alpha\beta}$, $M_{\alpha\beta}$, $Z_{\alpha\beta}$, and $Y_{\alpha\beta}$ transfer functions.

For example, in the embodiment illustrated in FIG. 5, the stationary receivers 304 may be located at a point $r_0$, and the moving receivers 504 may be located at a point with the radius vector r. The stationary receivers 304 may measure any combination of the components of the electromagnetic field $\{E_x, E_y, E_z, H_x, H_y, H_z\}$, the moving receivers 504 may measure any combination of the components of the electromagnetic field, for example, electric field component $E_y$. In this case, i.e. when measuring all components of the electromagnetic field, the six fields $T_{y\beta}(r, r_0)$ and $Z_{y\beta}(r,r_0)$ representing the electric and impedance transfer functions along the survey profile or over the survey area may be determined 706.

In another example, in the embodiment illustrated in FIG. 6, the stationary receivers 304 may be located at a point $r_0$, and the moving receivers 504 may be located at a point with the radius vector r. The stationary receivers 304 may measure any combination of the electromagnetic field components $\{E_x, E_y, E_z, H_x, H_y, H_z\}$; the moving receivers 504 may also measure any combination of the electromagnetic field components, for example, electric field component $E_y$.

The least squares method may be used to determine 706 at least one transfer function. For example, let us assume that we have a series of measurements of the ULF/ELF signal at a given frequency, $\omega$, $$E_i^x, E_i^y, E_i^z, H_i^x, H_i^y, H_i^z i = 1, 2, \ldots, N.$$

Consider, as an example, the electric transfer function, $T_{\alpha\beta}$. In accord with equations (1), we write:

$$E_{\alpha i}(r) = \sum_{\beta=x,y,z} T_{\alpha\beta}(r, r_0) E_{\beta i}(r_0) + e_{\alpha i}, \alpha = x, y, z; i = 1, 2, \ldots, N; \quad (5)$$

where $e_{\alpha i}$ may be error terms, caused by the noise in the data.

The least squares method may permit us to find the transfer functions, which may minimize the weighted sum of the squares of the absolute values of the errors in the linear relationship:

$$\phi(T_{\alpha\beta}) = \sum_{\alpha=x,y,z} \sum_{i=1}^{N} w_{\alpha i} |e_{\alpha i}|^2 = \quad (6)$$

$$\sum_{\alpha=x,y,z} \sum_{i=1}^{N} w_{\alpha i} |E_{\alpha i}(r) - T_{\alpha\beta}(r, r_0) E_{\beta i}(r_0)|^2 = \min,$$

where weights, $w_{\alpha i}$, may be inversely proportional to the dispersions of the errors:

$$w_{\alpha i} = 1/\sigma_{\alpha i}^2. \quad (7)$$

The variational operator may be applied with respect to the transfer functions to functional $\phi$ and the result may be equaled to zero to obtain a system of linear equations for $T_{\alpha\beta}$ which have the following solution:

$$T_{\alpha\beta}(r, r_0) = S_{\alpha\beta}(r, r_0)/S_{\beta\beta}(r_0), \quad (8)$$

where $$S_{\alpha\beta}(r, r_0) = \sum_{i=1}^{N} w_{\alpha i} E_{\alpha i}(r) E_{\beta i}^*(r_0), \quad = \sum_{i=1}^{N} w_{\alpha i} |E_{\beta i}^*(r_0)|^2. \quad (9)$$

In summary, the least squares method with weights may allow us to exclude or reduce the effect of the errors with unequal dispersions on the results of the transfer functions calculations from the ULF/ELF data. In other embodiments, other methods may be used to determine 706 the at least one transfer function.

The determined at least one transfer function may be correlated 708 with geological formations and/or hydrocarbon deposits 110. The determined at least one transfer function may be correlated 708 with geological formations and/or hydrocarbon deposits 110 may be used to determine the location of a hydrocarbon deposit 110.

Correlating 708 the determined at least one transfer function may be accomplished using the following exemplary steps. For example, we may, generally, consider an appropriate geoelectrical model of the sea-bottom geological formation. The interpretation problem may be formulated for the USBEM data measured 704 at the sea-bottom.

The field measured 704 by the receivers 104 may be represented as a sum of the background electromagnetic field, $\{E^b, H^b\}$, which may be generated in the background model formed by the sea water and the sedimental layers, and an anomalous part, $\{E^a, H^a\}$ related to the anomalous conductivity $\Delta\sigma$ (the conductivity inhomogeneities) present in the sea-bottom:

$$E = E^b + E^a, H = H^b + H^a.$$

We may use the integral form of Maxwell's equations to express the electromagnetic field measured 704 by the receivers 104:

$$E_\alpha(r_j) = \sum_{\beta=x,y,z} \iiint_D G_{E\alpha\beta}(r_j | r) \cdot [\Delta\sigma(r) E_\beta(r)] dv + E_\alpha^b(r_j), \quad (10)$$

$$H_\alpha(r_j) = \sum_{\beta=x,y,z} \iiint_D G_{H\alpha\beta}(r_j | r) \cdot [\Delta\sigma(r) E_\beta(r)] dv + H_\alpha^b(r_j), \quad (11)$$

$$\alpha = x, y, z,$$

where $G_{E\alpha\beta}(r_j|r)$ and $G_{H\alpha\beta}(r_j r)$ ($\alpha,\beta = x, y, z$) are the components of the electric and magnetic Green's tensors defined for a medium where the background conductivity $\sigma_b$ and domain D may represent a volume with the anomalous conductivity distribution $\sigma(r) = \sigma_b + \Delta\sigma(r)$, $r \in D$.

Substituting equations (10) and (11) into expressions (1)-(4) and solving the last equations with respect to $T_{\alpha\beta}$, $M_{\alpha\beta}$, $Z_{\alpha\beta}$, and $Y_{\alpha\beta}$ we may determine 706 the corresponding transfer functions.

In short form, the relationships between the anomalous conductivity, $\Delta\sigma$ and the transfer functions, $T_{\alpha\beta}$, $M_{\alpha\beta}$, $Z_{\alpha\beta}$, and $Y_{\alpha\beta}$ expressed by equations (10)-(11) and expressions (1)-(4) may be correlated 708 as an operator equation:

$$d = A(\Delta\sigma), \quad (12)$$

where A may be a forward modeling operator, d may stand for the corresponding transfer functions computed from the observed (i.e. measured 704) electromagnetic data in the sea-bottom receivers, and $\Delta\sigma$ may be a vector formed by the anomalous conductivities within the targeted domain.

Note that a sea-water layer may usually be characterized by a low resistivity of about 0.25 Ohm-m, and the sea-bottom sediments may also be very conductive with the resistivity of the order of 1 Ohm-m. At the same time, the sea-bottom hydrocarbon deposits 110 may usually be characterized by relatively high resistivity in the range from tens of Ohm-m up to several hundred Ohm-m. Therefore, the hydrocarbon deposit 110 may represent a relatively strong resistivity anomaly with the negative anomalous conductivity, $\Delta\sigma$. The correlation 708 of the data (in this embodiment, the determined electromagnetic transfer functions) measured 704 by the receivers 104 may be used to determine the location and shape of the anomaly. Three-dimensional (3D) forward and inverse electromagnetic modeling may be used to make this determination.

FIG. 8 is a flow diagram of an embodiment of a method 800 for measuring resistivity of geologic formations. The method 800 may include generating 802 an electromagnetic field over a plurality of frequencies. For example, the frequency domain current in the electromagnetic transmitter 102 may generate an electromagnetic field for at least several frequencies. At least one component of the electromagnetic field may be measured 804 over the plurality of frequencies. For example, the receivers 104 may measure 804 the signal at several frequencies.

A conductivity distribution may be determined 806 based on the at least one measured component. For example, the multi-frequency measurements may be used for frequency electromagnetic sounding of the medium at different distances from the sea-bottom to produce a volume image of the conductivity distribution. The determined conductivity distribution may be correlated 808 with geological formations and/or hydrocarbon deposits 110.

Figure 9:
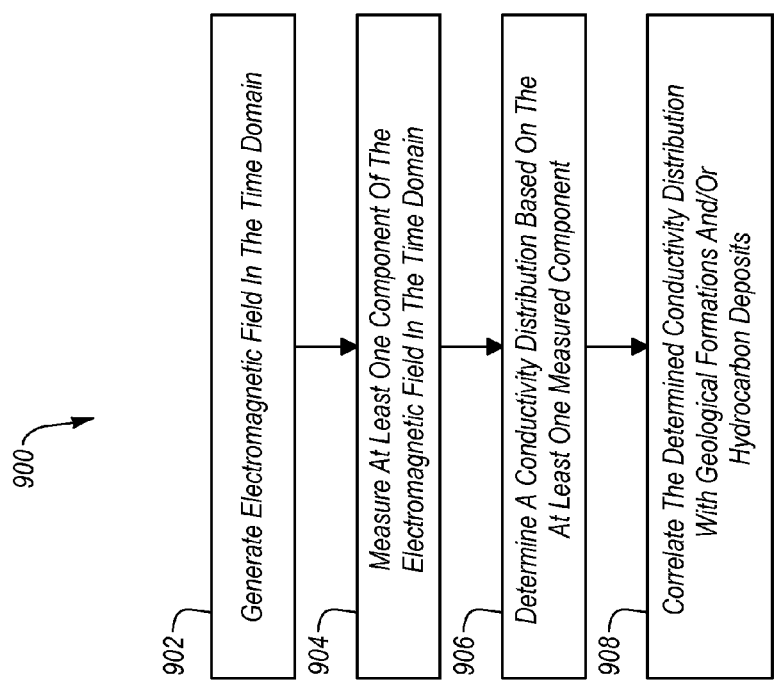
FIG. 9 is a flow diagram of a still further embodiment of a method for measuring resistivity of geologic formations.

FIG. 9 is a flow diagram of an embodiment of a method 900 for measuring resistivity of geologic formations. The method 900 may include generating 902 an electromagnetic field in the time domain. For example, the pulse (time domain) current in the transmitter may generate 902 an electromagnetic field. At least one component of the electromagnetic field may be measured 904 in the time domain. For example, the receivers 104 may measure 904 the signal at different time moments.

A conductivity distribution may be determined 906 based on the at least one measured component. For example, the transient measurements may be used for time domain electromagnetic sounding of the medium at different distances from the sea-bottom to produce a volume image of the conductivity distribution. The determined conductivity distribution may be correlated 908 with geological formations and/or hydrocarbon deposits 110.

Figure 10:
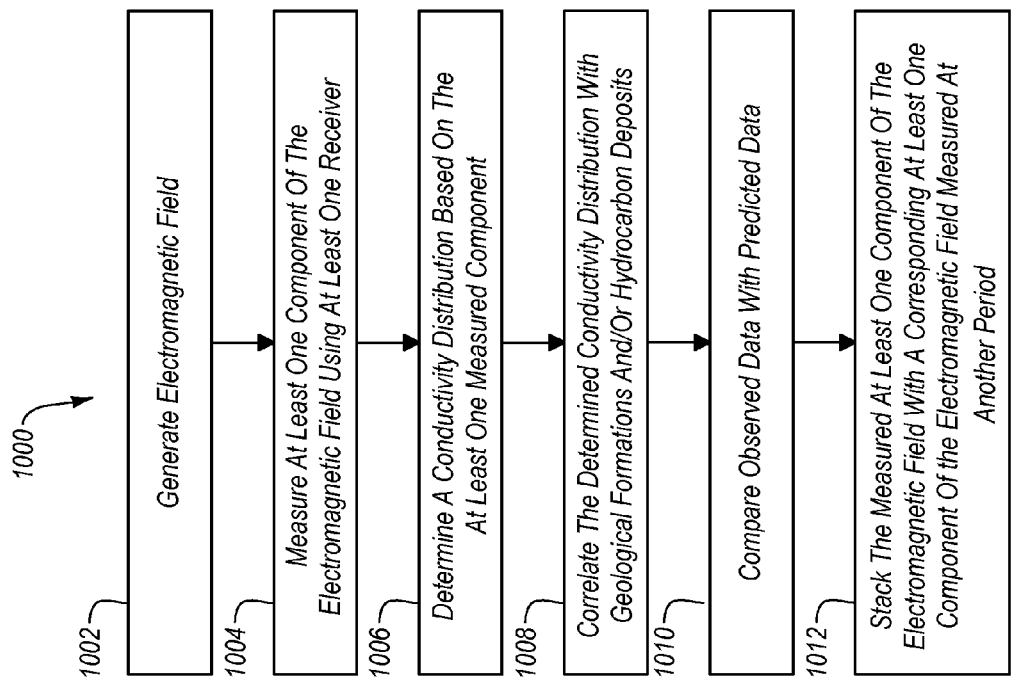
FIG. 10 is a flow diagram of a further embodiment of a method for measuring resistivity of geologic formations.

FIG. 10 is a flow diagram of an embodiment of a method 1000 for measuring resistivity of geological formations. The method 1000 may include generating 1002 an electromagnetic field. The electromagnetic field may be generated 1002 by an electromagnetic transmitter 102. The electromagnetic transmitter 102 may be located on land or ice, like the electromagnetic transmitter 302 described in FIGS. 3, 5, 14, and 16 or underwater, like the electromagnetic transmitter 402 described in FIGS. 4, 6, 15, and 17.

At least one component of the electromagnetic field may be measured 1004. Receivers 104 may measure 1004 the electromagnetic field. For example, stationary and/or moving receivers 304, 504 may measure 1004 at least one component of the electromagnetic field. In some embodiments, the amplitude and/or phase of the electromagnetic field may be measured 1004. In further embodiments, the magnetic and/or electric components of the electromagnetic field may be measured 1004.

A conductivity distribution may be determined 1006 based on the at least one measured component. The conductivity distribution may include the conductivity distribution for a hydrocarbon deposit 110, geological formations, and/or other formations and/or deposits. In some embodiments, the conductivity distribution may be determined 1006 by determining 706 at least one transfer function based on a plurality of measured components of the electromagnetic field.

The determined conductivity distribution may be correlated 1008 with geological formations and/or hydrocarbon deposits 110. In some embodiments, the determined at least one transfer function may be correlated 708 with geological formations and/or hydrocarbon deposits 110.

Observed data may be compared 1010 with predicted data. Traditionally, the electromagnetic inversion may be based on minimization of the parametric functional, $P^{\alpha}(\Delta\sigma)$ with the corresponding stabilizer $s(\Delta\sigma)$ $$P^{\alpha}(\Delta\sigma) = \phi(\Delta\sigma) + \alpha s(\Delta\sigma) \quad (13)$$

where $\phi(\Delta\sigma)$ may represent the misfit functional between the predicted data and the observed (i.e. measured 1004) data, and $\alpha$ is a regularization parameter.

The misfit functional may indicate how well the data predicted for a given conductivity model fit with the observed data. The stabilizing functional (the stabilizer) may be used to bring the a priori information about the desirable properties of the geological section into the inversion algorithm. New stabilizers may be used, which may make it possible to produce clearer and more focused images of the inverse models than the traditional maximum smoothness stabilizers. For example, minimum support (MS) and minimum gradient support (MGS) functionals may be useful in the solution of geophysical inverse problems. These functionals may help to select the desired stable solution from the class of solutions with the specific physical and/or geometrical properties. In imaging a hydrocarbon deposit 110 using the ULF/ELF signal, one of these properties may include the existence of sharp boundaries separating geological formations with different physical parameters, e.g., oil and water saturated deposits in petroleum exploration. This approach is typically called the regularized focusing inversion.

The parametric functional $P(\Delta\sigma)$ may be minimized by using gradient type methods. For example, the regularized conjugate gradient (RCG) algorithm of the parametric functional minimization in the case of the minimum norm stabilizer may be summarized as follows:

$$r_n = A(\Delta\sigma_n) - d, (a)$$

$$l_n = l(\Delta\sigma_n) = ReF^*_n W^*_d W_d r_n + \alpha W^*_m W_d (\Delta\sigma_n - \Delta\sigma_{apr}) (b)$$

$$\beta_n = \|l_n\|^2 / \|l_{n-1}\|^2, \tilde{l}_n = l_n + \beta_n \tilde{l}_{n-1}, \tilde{l}_0 = l_0 (c)$$

$$k_n = (\tilde{l}_n, l) / \{\|W_d F_n \tilde{l}_n\|^2 + \|W_m \tilde{l}_n\|^2\}, (d)$$

$$\Delta\sigma_{n+1} = \Delta\sigma - k_n \tilde{l}_n, (e) \quad (14)$$

where $k_n$ may represent a length of the iteration step, and $\tilde{l}_n$ may represent the gradient direction, which may be computed using the adjoint Fréchet derivative matrix, $F^*_n$, for the forward modeling operator (12).

We may determine the data weights as a diagonal matrix formed by the inverse absolute values of the background field. Computation of the model weighting matrix may be based on sensitivity analysis. We may select $W_m$ as the square root of the sensitivity matrix in the initial model:

$$W_m = \sqrt{\text{diag}(F^*_0 F_0)^{1/2}}. \quad (15)$$

As a result, we may obtain a uniform sensitivity of the data to different model parameters.

By solving the electromagnetic inverse problem (12) we may produce a 3D conductivity distribution in the geological formations. The conductivity model may be inferred by inversion from the observed USBEM survey data that produces a 3D image of a hydrocarbon deposit 110, associated with the high resistivity zone.

In the present embodiment, the measured at least one component of the electromagnetic field may be stacked 1012 with a corresponding at least one component of the electromagnetic field measured at another period.

Improvements to the signal-to-noise ratio may be realized by stacking 1012 the observed signal over an appropriate period of time. In the case of the uncorrelated noise, the signal-to-noise ratio may increase by $\sqrt{N}$ where N is the number of stacked signals. For example, if the frequency of the observed signal is about 0.1 Hz, it may be sufficient to record this signal repeatedly over a two hour period to improve a signal-to-noise ratio about 25 times.

Figure 11:
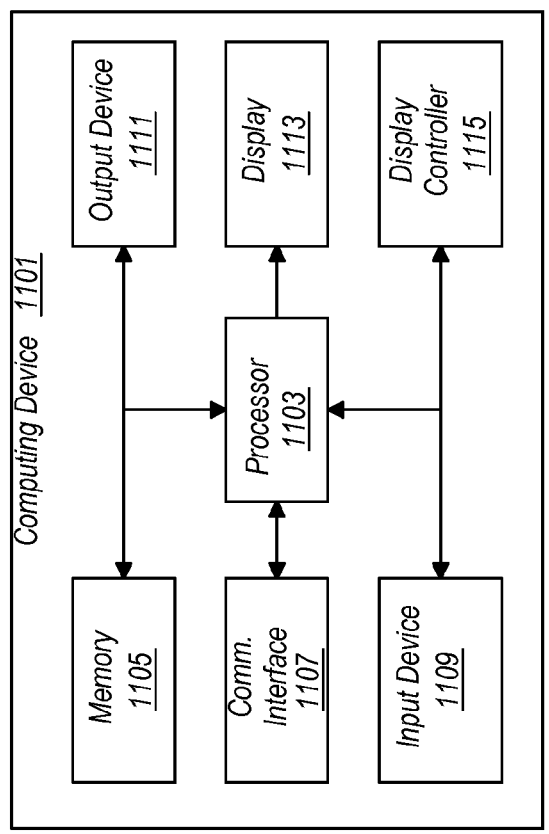
FIG. 11 illustrates various components that may be utilized in a computing device.

FIG. 11 illustrates various components that may be utilized in a computing device 1101. A receiver 104, an electromagnetic transmitter 102 and/or other devices may be examples of a computing device 1101. The illustrated components may be located within the same physical structure or in separate housings or structures.

The computing device 1101 may include a processor 1103 and memory 1105. The processor 1103 may control the operation of the computing device 1101 and may be embodied as a microprocessor, a microcontroller, a digital signal processor (DSP) or other device known in the art. The processor 1103 typically performs logical and arithmetic operations based on program instructions stored within the memory 1105. The instructions in the memory 1105 may be executable to implement the methods described herein.

The computing device 1101 may also include one or more communication interfaces 1107 for communicating with other electronic devices. The communication interface(s) 1107 may be based on wired communication technology, wireless communication technology, and/or other communication technology.

The computing device 1101 may also include one or more input devices 1109 and one or more output devices 1111. The input devices 1109 and output devices 1111 may facilitate user input. Examples of different kinds of input devices 1109 may include a keyboard, mouse, microphone, remote control device, button, joystick, trackball, touchpad, lightpen, etc. Examples of different kinds of output devices 1111 may include a speaker, printer, etc. One specific type of output device which may be used in a computer system is a display device 1113. Display devices 1113 used with embodiments disclosed herein may utilize any suitable image projection technology, such as a cathode ray tube (CRT), liquid crystal display (LCD), light-emitting diode (LED), gas plasma, electroluminescence, or the like. A display controller 1115 may also be provided, for converting data stored in the memory 1105 into text, graphics, and/or moving images (as appropriate) shown on the display device 1113. Other components may also be provided as part of the computing device 1101.

FIG. 11 illustrates only one possible configuration of a computing device 1101. Various other architectures and components may be utilized.

Figure 12:
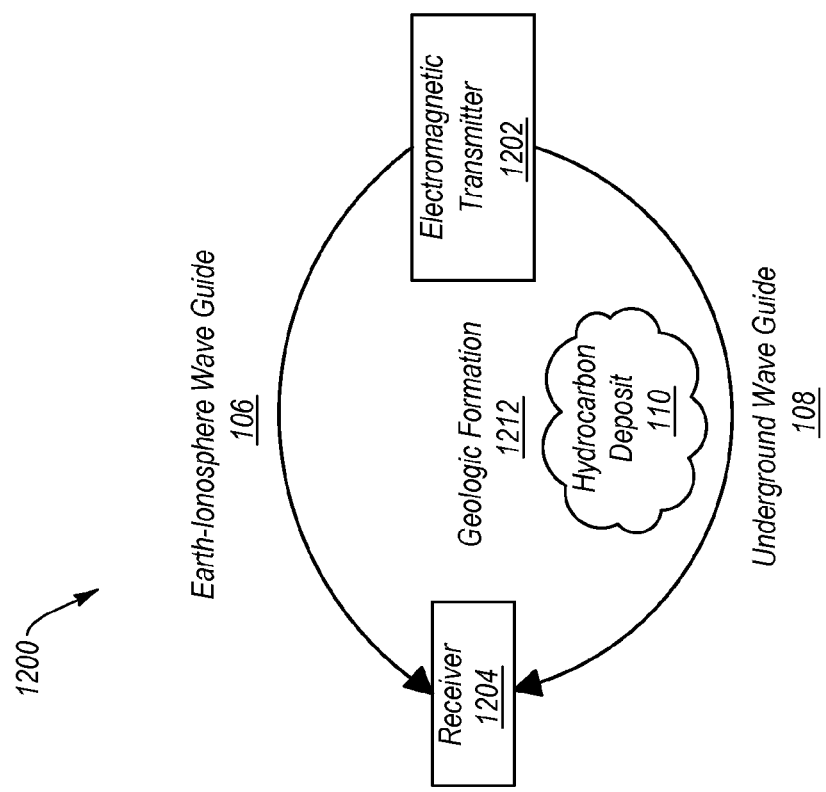
FIG. 12 is a conceptual block diagram illustrating an embodiment of a system for measuring resistivity of rock formations.

FIG. 12 is a conceptual block diagram illustrating an embodiment of a system 1200 for measuring geologic resistivity. The system 1200 may include an electromagnetic transmitter 1202 and a receiver 1204. The electromagnetic transmitter 1202 may generate an electromagnetic field.

The generated electromagnetic field may be propagated through the earth-ionospheric wave guide 106 and/or the underground wave guide 108 formed within the earth's crust. The generated electromagnetic field may reach the receiver 1204. The receiver 1204 may be used to measure at least one component of the electromagnetic field.

A hydrocarbon deposit 110 may be located subsurface of the geologic formation 1212. For example, the subsurface may include geological formations 1212 with a known conductivity distribution.

Figure 13:
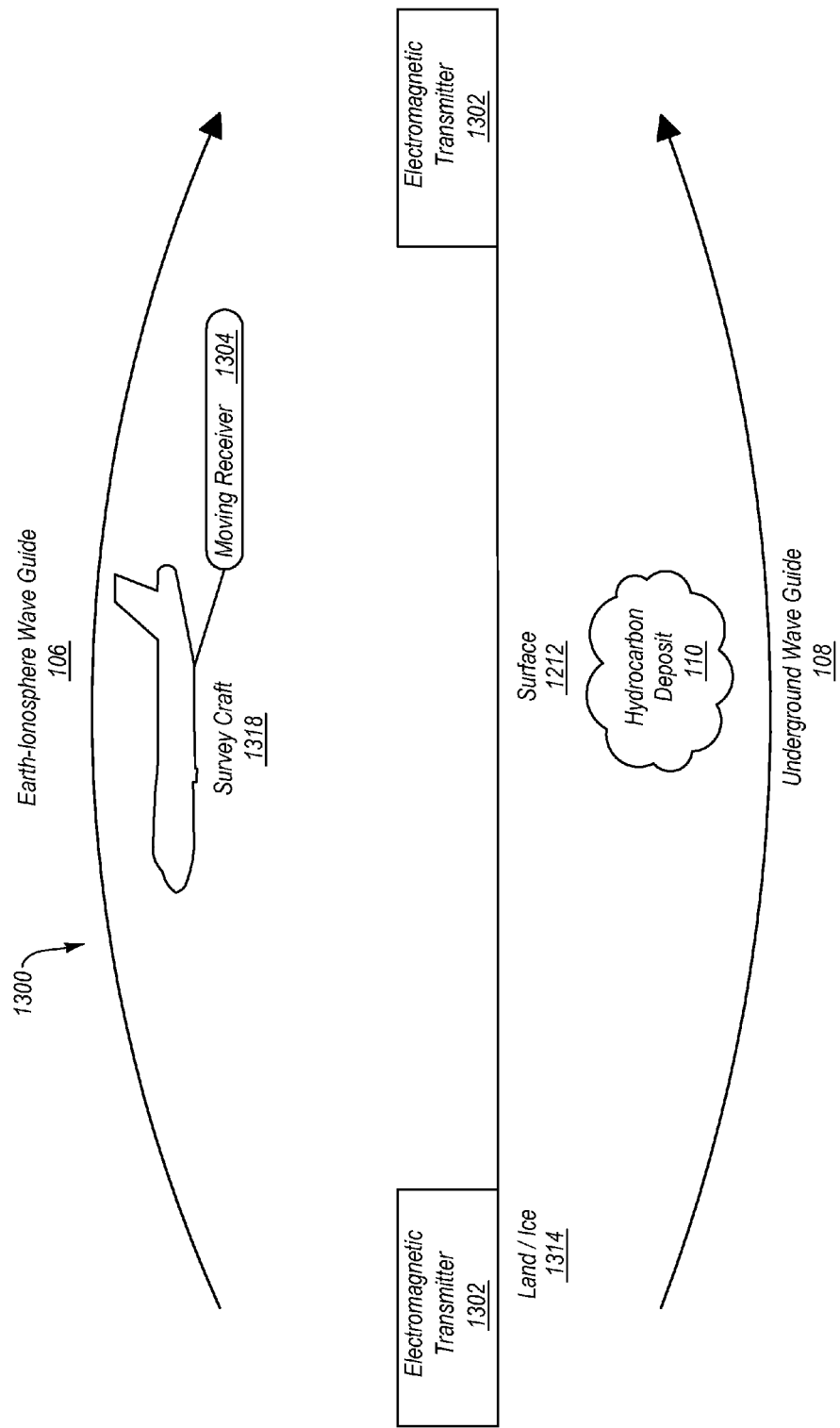
FIG. 13 is a conceptual block diagram illustrating another embodiment of a system for measuring resistivity of rock formations.

FIG. 13 is a conceptual block diagram illustrating another embodiment of a system 1300 for measuring resistivity of geologic formations. The system 1300 may include at least one electromagnetic transmitter 1302 and at least one receiver 1304.

The electromagnetic transmitter 1302 may be located on land or the sea ice 1314. The electromagnetic transmitter 1302 may be a stationary long-range transmitter. In the present embodiment, the electromagnetic transmitter 1302 may be a system of grounded electric bipoles. The system of grounded electric bipoles may be more than three kilometers in length. In other embodiments, the electromagnetic transmitter 1302 may be a loop of wire. The loop of wire may have a radius of more than three kilometers.

The at least one receiver 1304 may be mobile. As shown in FIG. 13, the at least one receiver may be operatively associated with a survey craft 1318 and/or other vehicles. The survey craft 1318 may include fixed wing airplanes, propeller airplanes, jet propelled airplanes, unmanned aerial vehicles, other vehicles, or combinations thereof. The at least one receiver 1304 may be an airborne receiver. For example, a receiver may be located above the outer surface of the earth. In a further example, a receiver may be located substantially above the outer surface of the earth.

Although the present embodiment is generally described as using receivers 1304 that are airborne and/or mobile, other receivers may be used. For example, in embodiments where the presence and/or location of hydrocarbon deposits in a sea-bed may be desirable, the at least one receiver 1304 may be supplemented with other receivers, such as receivers 304 that may be located at and/or near the sea bottom, underwater moving receivers (such as receiver 1404 shown in FIG. 14), other receivers, or combinations thereof.

The electromagnetic transmitter 1302 may generate an electromagnetic field. In the present embodiment, the frequency of the electromagnetic field may be between and/or including the ELF and ULF range. In other embodiments, the frequency of the electromagnetic field may be in another range. For example, the frequency may be in the ELF, SLF, ULF, and/or another frequency range. The frequency range may be selected based on whether the frequency range may propagate through the earth-ionospheric wave guide 106 and/or the underground wave guide 108 formed within the earth's crust.

The generated electromagnetic field may be propagated through the earth-ionospheric wave guide 106 and/or the underground wave guide 108 formed within the earth's crust. The generated electromagnetic field may reach the receivers 1304.

The receivers 1304 may be used to measure at least one component of the electromagnetic field. The receivers 1304 may be galvanic, induction and/or other receiver types. At least one receiver 1304 may record voltage detected by the at least one receiver 1304. The receivers 1304 may measure at least one component of the electromagnetic field. For example, the receivers 1304 may measure the amplitude and/or phase of the electromagnetic field. In another example, the receivers 1304 may measure magnetic and/or electric components of the electromagnetic field.

A hydrocarbon deposit 110 may be located in the geologic formation 1212. For example, the region below the outer surface of the earth 1212 may include geological formations with a known conductivity distribution.

Figure 14:
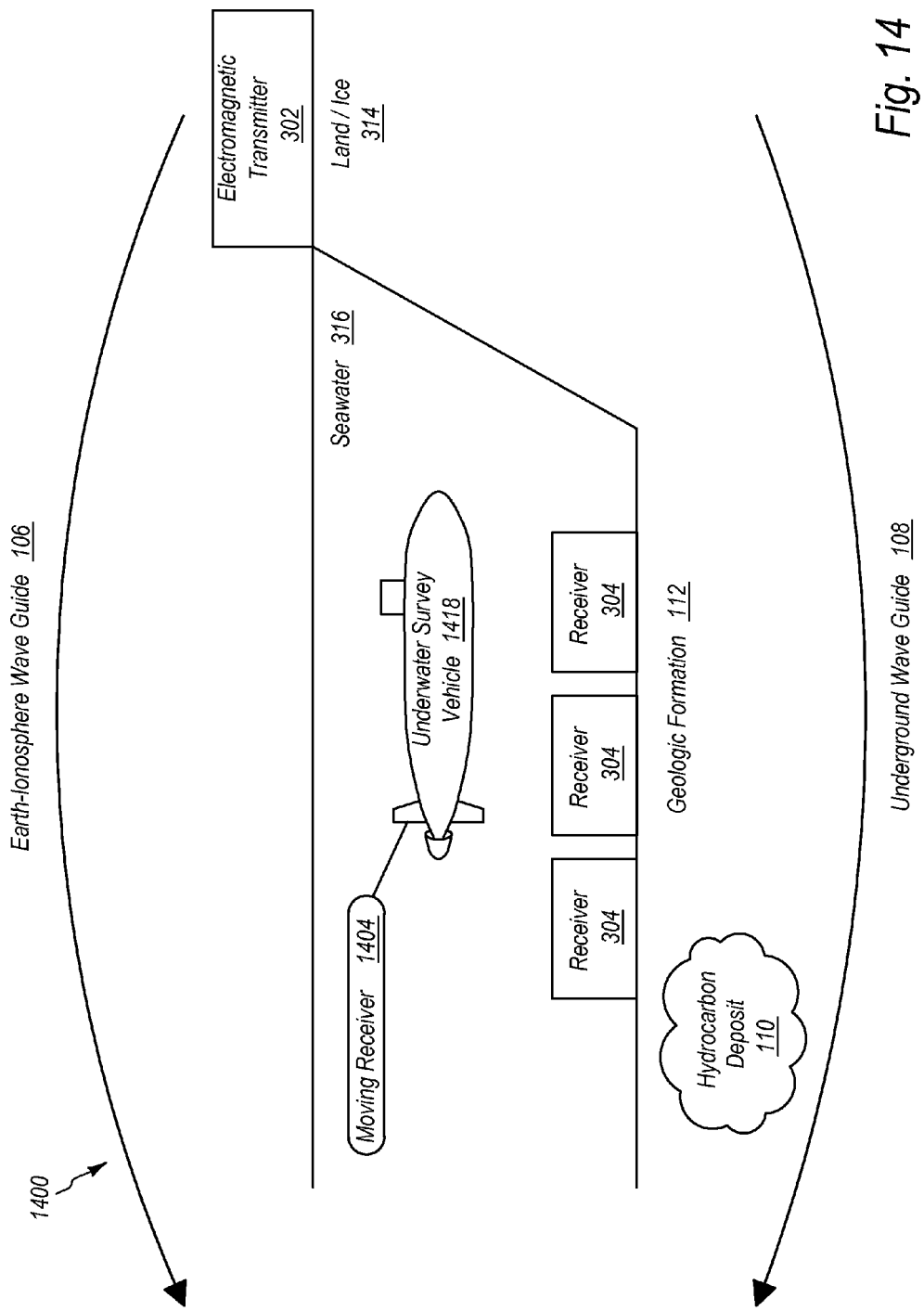
FIG. 14 is a conceptual block diagram illustrating another embodiment of a system for measuring sea-bed resistivity.

FIG. 14 is a conceptual block diagram illustrating a still further embodiment of a system 1400 for measuring sea-bed resistivity. The system 1400 may include an electromagnetic transmitter 302 and at least one receiver 304, 1404.

The electromagnetic transmitter 302 may be located on land or the sea ice 314. The ice 314 may be any ice formation, such as ocean surface ice, lake surface ice, or glacier ice. The electromagnetic transmitter 302 may be a stationary long-range transmitter. In the present embodiment, the electromagnetic transmitter 302 may be a system of grounded electric bipoles. The system of grounded electric bipoles may be several kilometers in length. For example, the system of grounded bipoles may be more than three kilometers in length. In other embodiments, the electromagnetic transmitter 302 may be a loop of wire. The loop of wire may have a radius of more than several kilometers. For example, the loop of wire may have a radius of more than three kilometers.

The receivers 304 may be located in the seawater 316. In other embodiments, the receivers 304 may be located in freshwater, etc. The receivers 304 may be located on sea-bed 112. In other embodiments, the receivers 304 may be located in a borehole. For example, the receivers 304 may be located in a borehole at the sea bottom. In the present embodiment, the system 1400 may include at least one receiver 304 located on a sea-bed 112 and/or at least one moving receiver 1404. As shown in FIG. 14, the at least one receiver may be operatively associated with an underwater survey vehicle 1418 and/or other vehicles. The survey vehicle 1418 may include submarines, autonomous underwater vehicles, remotely operated underwater vehicles, other vehicles, or combinations thereof. In the present embodiment, only one moving receiver 1404 is illustrated. In other embodiments, multiple moving receivers 1404 may be used. In some embodiments, the system 1400 may be a USBEM survey configuration using an on land electromagnetic transmitter 302, a set of fixed sea-bottom receivers 304, and another set of moving receivers 1404 of electric and/or magnetic fields, operatively associated with an underwater survey vehicle 1418.

In some embodiments, the moving receiver 1404 may be may be operatively associated with other survey craft and/or other vehicles. Survey craft may include fixed wing airplanes, propeller airplanes, jet propelled airplanes, unmanned aerial vehicles, other vehicles, or combinations thereof. The receiver 1404 may be an airborne receiver. For example, a receiver 1404 may be located above the outer surface of the earth. In a further example, a receiver 1404 may be located substantially above the outer surface of the earth.

In further embodiments, the transmitter may be located in the close proximity to the prospective hydrocarbon deposit. The moving receiver operatively associated with the survey vehicle, underwater survey vehicle, other vehicles, or combinations thereof, may be located in the area directly above the prospective hydrocarbon deposit. The measurements can be used for a detection and characterization of the hydrocarbon reservoir. The measurements of the EM field by the receiver can be conducted repeatedly over a relatively short (several days/weeks) or relatively long (months, years) period of time. The time-lapse EM measurements may be used for characterization and monitoring the flow of oil and gas from the hydrocarbon reservoirs as they deplete.

Multiple receivers 1404 may be used. For example, one receiver (such as receiver 1304 shown in FIG. 13) may be operatively associated with an airborne survey craft (such as survey craft 1318 shown in FIG. 13), another receiver (such as receiver 504 shown in FIG. 5) may be operatively associated with a survey vessel 518 (such as survey vehicle 518 shown in FIG. 5), and another receiver 1404 may be operatively associated with an underwater survey vehicle 1418.

The electromagnetic transmitter 302 may generate an electromagnetic field. In the present embodiment, the frequency of the electromagnetic field may be between and/or including the ELF and ULF range. In other embodiments, the frequency of the electromagnetic field may be in another range. For example, the frequency may be in the ELF, SLF, ULF and/or another frequency range.

The generated electromagnetic field may be propagated through the earth-ionospheric wave guide 106 and/or the underground wave guide 108 formed within the earth's crust. The generated electromagnetic field may reach the receivers 304, 1404.

The receivers 304, 1404 may be used to measure at least one component of the electromagnetic field. The receivers 304, 1404 may be galvanic, induction and/or other receiver types. At least one receiver 304, 1404 may record voltage detected by the at least one receiver 304, 1404. The receivers 304, 1404 may measure at least one component of the electromagnetic field. For example, the receivers 304, 1404 may measure the amplitude and/or phase of the electromagnetic field. In another example, the receivers 304, 1404 may measure a magnetic, electric and/or other component of the electromagnetic field.

A hydrocarbon deposit 110 may be located within the sea-bed 112. For example, the sea-bed 112 may include geological formations with a known conductivity distribution.

Figure 15:
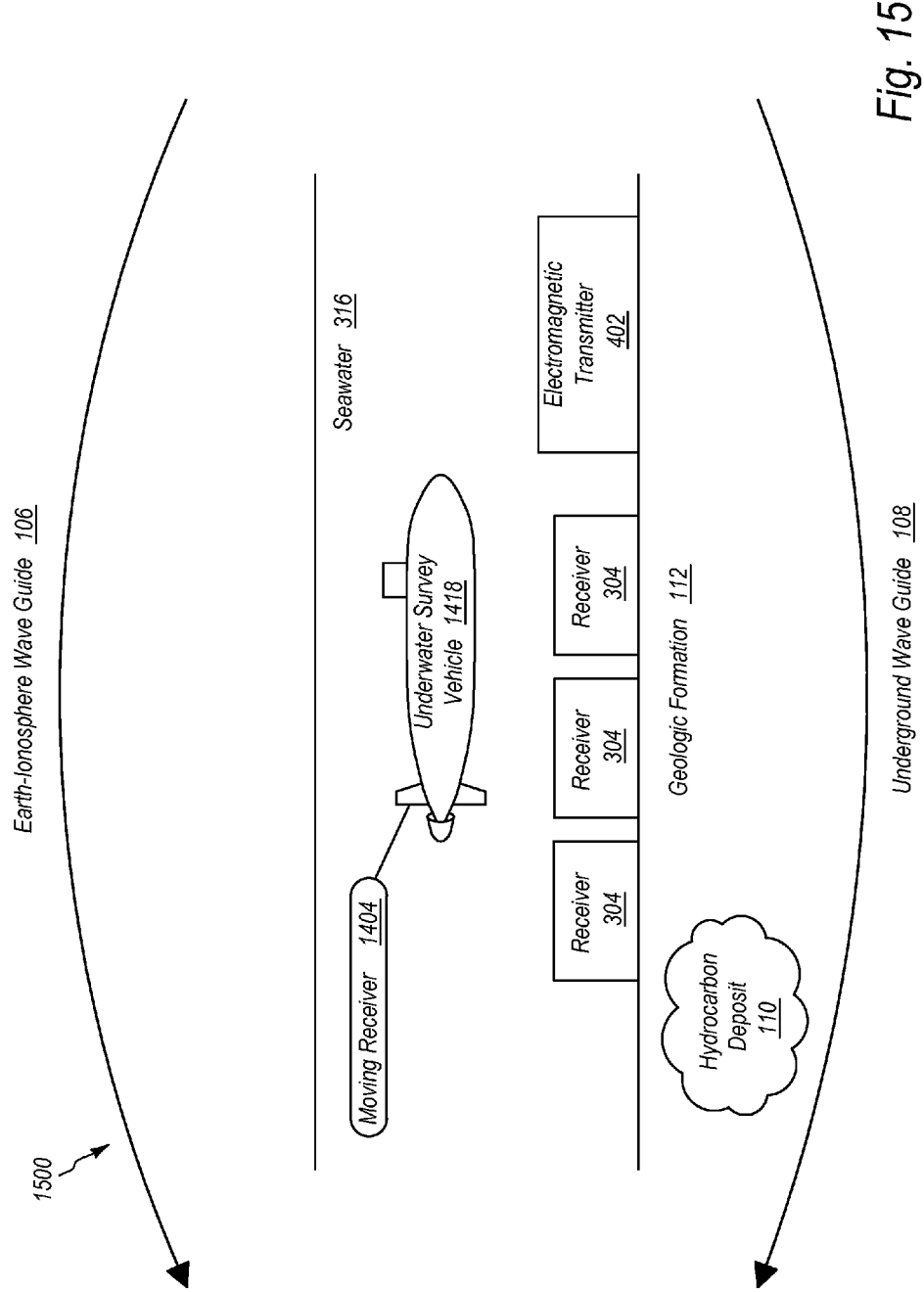
FIG. 15 is a conceptual block diagram illustrating a further embodiment of a system for measuring sea-bed resistivity.

FIG. 15 is a conceptual block diagram illustrating a further embodiment of a system 1500 for measuring sea-bed resistivity. The system 1500 may include an electromagnetic transmitter 402 and at least one receiver 304, 1404.

The electromagnetic transmitter 402 may be located in the seawater 316. The electromagnetic transmitter 402 may be an undersea communication cable. The electromagnetic transmitter 402 may be located on a sea-bed 112. In the present embodiment, the electromagnetic transmitter 402 is located at the sea bottom.

The receivers 304, 1404 may be located in the seawater 316. In other embodiments, the receivers 304, 1404 may be located in freshwater, etc. Some of the receivers 304 may be located on a sea-bed 112. In other embodiments, some of the receivers 304 may be located in a borehole. For example, the receivers 304 may be located in a borehole in the sea-bed 112. In the present embodiment, the system 1500 may include at least one receiver 304 located on a sea-bed 112 and/or at least one moving receiver 1404. As shown in FIG. 15, the at least one receiver may be operatively associated with an underwater survey vehicle 1418 and/or other vehicles. The survey vehicle 1418 may include submarines, autonomous underwater vehicles, remotely operated underwater vehicles, other vehicles, or combinations thereof. In the present embodiment, only one moving receiver 1404 is illustrated. In other embodiments, multiple moving receivers 1404 may be used. In some embodiments, the system 1500 may be a USBEM survey configuration using a submarine cable electromagnetic transmitter 402, a set of fixed sea-bottom receivers 304, and another set of moving receivers 1404 of electric and/or magnetic fields, operatively associated with underwater survey vehicle 1418.

The electromagnetic transmitter 402 may generate an electromagnetic field. In the present embodiment, the frequency of the electromagnetic field may be between and/or including the ELF and ULF range. In other embodiments, the frequency of the electromagnetic field may be in another range. For example, the frequency may be in the ELF, SLF, ULF and/or another frequency range. The frequency range may be selected based on whether the frequency range may propagate through the earth-ionospheric wave guide 106 and/or the underground wave guide 108 formed within the earth's crust.

The generated electromagnetic field may be propagated through the earth-ionospheric wave guide 106 and/or the underground wave guide 108 formed within the earth's crust. The generated electromagnetic field may reach the receivers 304, 1404.

The receivers 304, 1404 may be used to measure at least one component of the electromagnetic field. The receivers 304, 1404 may be galvanic, induction and/or other receiver types. At least one receiver 304, 1404 may record voltage detected by the at least one receiver 304, 1404. The receivers 304, 1404 may measure at least one component of the electromagnetic field. For example, the receivers 304, 1404 may measure the amplitude and/or phase of the electromagnetic field. In another example, the receivers 304, 1404 may measure a magnetic, electric and/or other component of the electromagnetic field.

In some embodiments, the moving receiver 1404 may be operatively associated with other survey craft and/or other vehicles. Survey craft may include fixed wing airplanes, propeller airplanes, jet propelled airplanes, unmanned aerial vehicles, other vehicles, or combinations thereof. The receiver 1404 may be an airborne receiver. For example, a receiver 1404 may be located above the area of the prospective hydrocarbon reservoir location. In a further example, a receiver 1404 may be located substantially above the outer surface of the earth.

Multiple receivers 1404 may be used. For example, one receiver (such as receiver 1304 shown in FIG. 13) may be operatively associated with an airborne survey craft (such as survey craft 1318 shown in FIG. 13), another receiver (such as receiver 504 shown in FIG. 5) may be operatively associated with a survey vessel 518 (such as survey vehicle 518 shown in FIG. 5), and another receiver 1404 may be operatively associated with an underwater survey vehicle 1418.

A hydrocarbon deposit 110 may be located within the sea-bed 112. For example, the sea-bed 112 may include geological formations with a known conductivity distribution.

Figure 16:
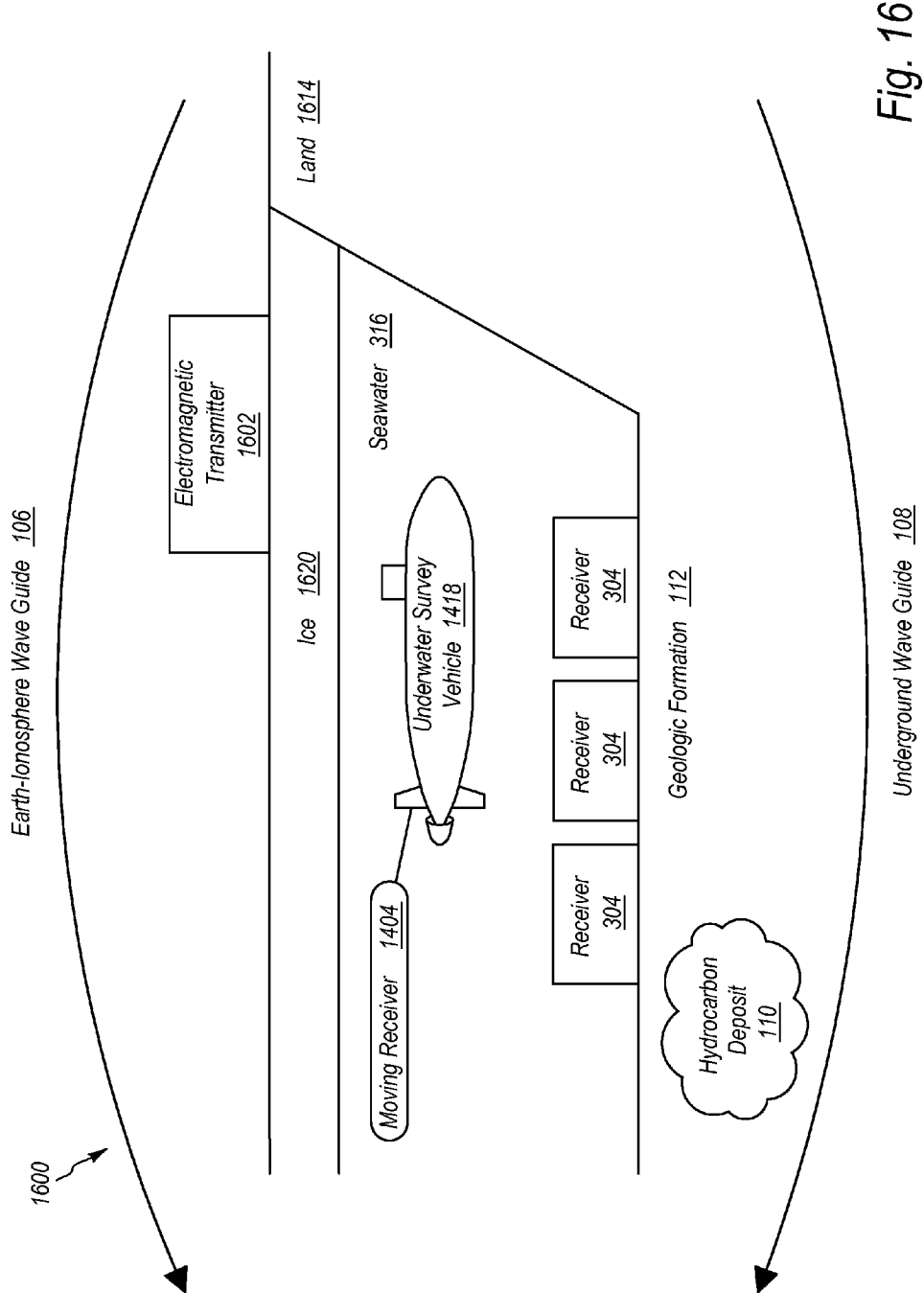
FIG. 16 is a conceptual block diagram illustrating an embodiment of a system for measuring sea-bed resistivity under sea ice and ice packs.

FIG. 16 is a conceptual block diagram illustrating another embodiment of a system 1600 for measuring ice or sea-bed resistivity. The system 1600 may include at least one electromagnetic transmitter 1602 and at least one receiver 304, 1404.

The electromagnetic transmitter 1602 may be located on land 1614 or ice 1620. The ice 1620 may be any ice formation, such as ocean surface ice, lake surface ice, or glacier ice. The electromagnetic transmitter 1602 may be a stationary long-range transmitter. In the present embodiment, the electromagnetic transmitter 1602 may be a system of grounded electric bipoles. The system of grounded electric bipoles may be more than three kilometers in length. In other embodiments, the electromagnetic transmitter 1602 may be a loop of wire. The loop of wire may have a radius of more than three kilometers. In further embodiments, the electromagnetic transmitter 1602 may be located on the ice 1620.

The at least one receiver 1404 may be mobile. As shown in FIG. 16, the at least one receiver may be operatively associated with an underwater survey vehicle 1418 and/or other vehicles. The survey vehicle 1418 may include submarines, autonomous underwater vehicles, remotely operated underwater vehicles, other vehicles, or combinations thereof. In some embodiments, the at least one receiver 1404 may be operatively associated with survey crafts, such as fixed wing airplanes, propeller airplanes, jet propelled airplanes, unmanned aerial vehicles, other vehicles, or combinations thereof. The at least one receiver 1404 may be an airborne receiver. For example, a receiver may be located above the outer surface of the earth. In a further example, a receiver may be located substantially above the outer surface of the earth.

The system 1600 may also include stationary receivers 304. The receivers 304 may be located in the seawater 316. In other embodiments, the receivers 304 may be located in freshwater, etc. The receivers 304 may be located on a sea-bed 112. In other embodiments, the receivers 304 may be located in a borehole. For example, the receivers 304 may be located in a borehole in the ice 1620. In the present embodiment, the system 1600 may include at least one receiver 304 located on a sea-bed 112 and/or at least one moving receiver 1404. The at least one moving receiver 1404 may be operatively associated with an underwater survey vehicle 1418. In the present embodiment, only one moving receiver 1404 is illustrated. In embodiments where the presence and/or location of hydrocarbon deposits in the ocean or sea areas covered in ice may be desirable, mobile receivers 1404, operatively associated with an underwater survey vehicle 1418, may allow the receiver 1404 to travel under the sea ice rather than breaking the ice. In other embodiments, multiple moving receivers 1404 may be used. In some embodiments, the system 1600 may be a USBEM survey configuration using an on land electromagnetic transmitter 1602, a set of fixed sea-bottom receivers 304, and another set of moving receivers 1404 of electric and/or magnetic fields, operatively associated with an underwater survey vehicle 1418.

The electromagnetic transmitter 1602 may generate an electromagnetic field. In the present embodiment, the frequency of the electromagnetic field may be between and/or including the ELF and ULF range. In other embodiments, the frequency of the electromagnetic field may be in another range. For example, the frequency may be in the ELF, SLF, ULF, and/or another frequency range. The frequency range may be selected based on whether the frequency range may propagate through the earth-ionospheric wave guide 106 and/or the underground wave guide 108 formed within the earth's crust.

The generated electromagnetic field may be propagated through the earth-ionospheric wave guide 106 and/or the underground wave guide 108 formed within the earth's crust. The generated electromagnetic field may reach the receivers 304.

The receivers 1404 may be used to measure at least one component of the electromagnetic field. The receivers 1404 may be galvanic, induction and/or other receiver types. At least one receiver 1404 may record voltage detected by the at least one receiver 1404. The receivers 1404 may measure at least one component of the electromagnetic field. For example, the receivers 1404 may measure the amplitude and/or phase of the electromagnetic field. In another example, the receivers 1404 may measure magnetic and/or electric components of the electromagnetic field.

A hydrocarbon deposit 110 may be located within the sea-bed 112 or the ice 1620. For example, the sea-bed 112 may include geological formations with a known conductivity distribution.

Figure 17:
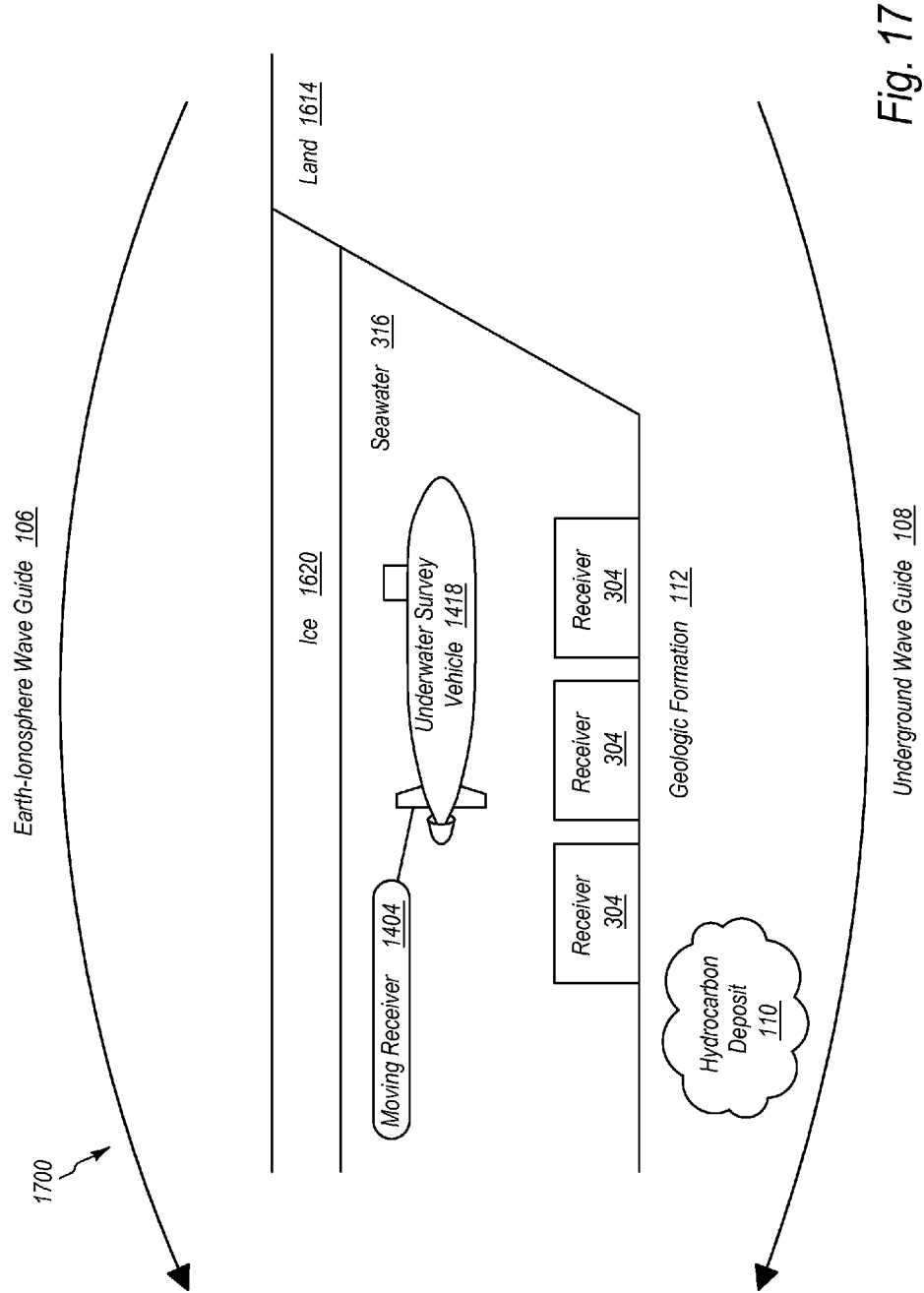
FIG. 17 is a conceptual block diagram illustrating another embodiment of a system for measuring sea-bed resistivity under sea ice and ice packs.

FIG. 17 is a conceptual block diagram illustrating a further embodiment of a system 1700 for measuring ice and/or sea-bed resistivity. The system 1700 may include an electromagnetic transmitter 1702 and at least one receiver 304, 1404.

The electromagnetic transmitter 1702 may be located in the seawater 316. The electromagnetic transmitter 1702 may be an undersea communication cable. The electromagnetic transmitter 1702 may be located on a sea-bed 112. In the present embodiment, the electromagnetic transmitter 1702 is located at the sea bottom.

The receivers 304, 1404 may be located in the seawater 316. In other embodiments, the receivers 304, 1404 may be located in freshwater, etc. Some of the receivers 304 may be located on a sea-bed 112. In other embodiments, some of the receivers 304 may be located in a borehole. For example, the receivers 304 may be located in a borehole in the ice 1620. In the present embodiment, the system 1700 may include at least one receiver 304 located on a sea-bed 112 and/or at least one moving receiver 1404. As shown in FIG. 17, the at least one receiver may be operatively associated with an underwater survey vehicle 1418 and/or other vehicles. The survey vehicle 1418 may include submarines, autonomous underwater vehicles, remotely operated underwater vehicles, other vehicles, or combinations thereof. In the present embodiment, only one moving receiver 1404 is illustrated. In embodiments where the presence and/or location of hydrocarbon deposits in areas covered in ice may be desirable, mobile receivers 1404, operatively associated with an underwater survey vehicle 1418, may allow the receiver 1404 to travel under the ice rather than breaking the ice. In other embodiments, multiple moving receivers 1404 may be used. In some embodiments, the system 1700 may be a USBEM survey configuration using a submarine cable electromagnetic transmitter 1702, a set of fixed sea-bottom receivers 304, and another set of moving receivers 1404 of electric and/or magnetic fields, operatively associated with underwater survey vehicle 1418.

The electromagnetic transmitter 1702 may generate an electromagnetic field. In the present embodiment, the frequency of the electromagnetic field may be between and/or including the ELF and ULF range. In other embodiments, the frequency of the electromagnetic field may be in another range. For example, the frequency may be in the ELF, SLF, ULF and/or another frequency range. The frequency range may be selected based on whether the frequency range may propagate through the earth-ionospheric wave guide 106 and/or the underground wave guide 108 formed within the earth's crust.

The generated electromagnetic field may be propagated through the earth-ionospheric wave guide 106 and/or the underground wave guide 108 formed within the earth's crust. The generated electromagnetic field may reach the receivers 304, 1404.

The receivers 304, 1404 may be used to measure at least one component of the electromagnetic field. The receivers 304, 1404 may be galvanic, induction and/or other receiver types. At least one receiver 304, 1404 may record voltage detected by the at least one receiver 304, 1404. The receivers 304, 1404 may measure at least one component of the electromagnetic field. For example, the receivers 304, 1404 may measure the amplitude and/or phase of the electromagnetic field. In another example, the receivers 304, 1404 may measure a magnetic, electric and/or other component of the electromagnetic field.

In some embodiments, the moving receiver 1404 may be operatively associated with other survey craft and/or other vehicles. Survey craft may include fixed wing airplanes, propeller airplanes, jet propelled airplanes, unmanned aerial vehicles, other vehicles, or combinations thereof. The receiver 1404 may be an airborne receiver. For example, a receiver 1404 may be located above the area of the prospective hydrocarbon reservoir location. In a further example, a receiver 1404 may be located substantially above the outer surface of the earth.

Multiple receivers 1404 may be used. For example, one receiver (such as receiver 1304 shown in FIG. 13) may be operatively associated with an airborne survey craft (such as survey craft 1318 shown in FIG. 13) and another receiver 1404 may be operatively associated with an underwater survey vehicle 1418.

A hydrocarbon deposit 110 may be located within the sea-bed 112 in the ocean or sea areas covered with ice 1620. For example, the sea-bed 112 may include geological formations with a known conductivity distribution.

Figure 18:
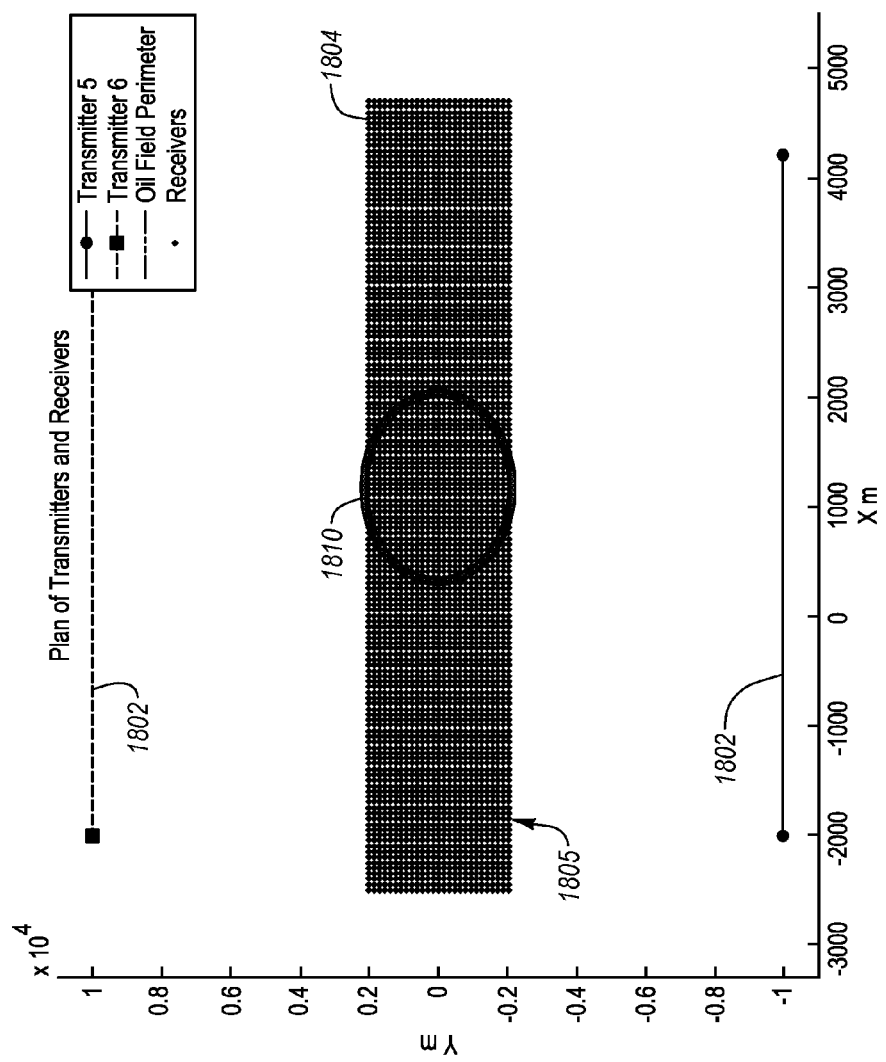
FIG. 18 is a conceptual diagram illustrating a further embodiment of a system for measuring resistivity of rock formations.

FIG. 18 is a conceptual diagram illustrating a further embodiment of a system 1800 for measuring resistivity of rock formations. The system 1800 may include at least one electromagnetic transmitter 1802 and at least one receiver 1804. As illustrated in FIG. 18, the system 1800 may use an electromagnetic transmitter 1802. In the present embodiment, the system 1800 may use two or more electromagnetic transmitters 1802 that may be about six kilometers in length.

In other embodiments, the electromagnetic transmitters 1802 may be from several hundred meters to several kilometers in length.

Figure 19:
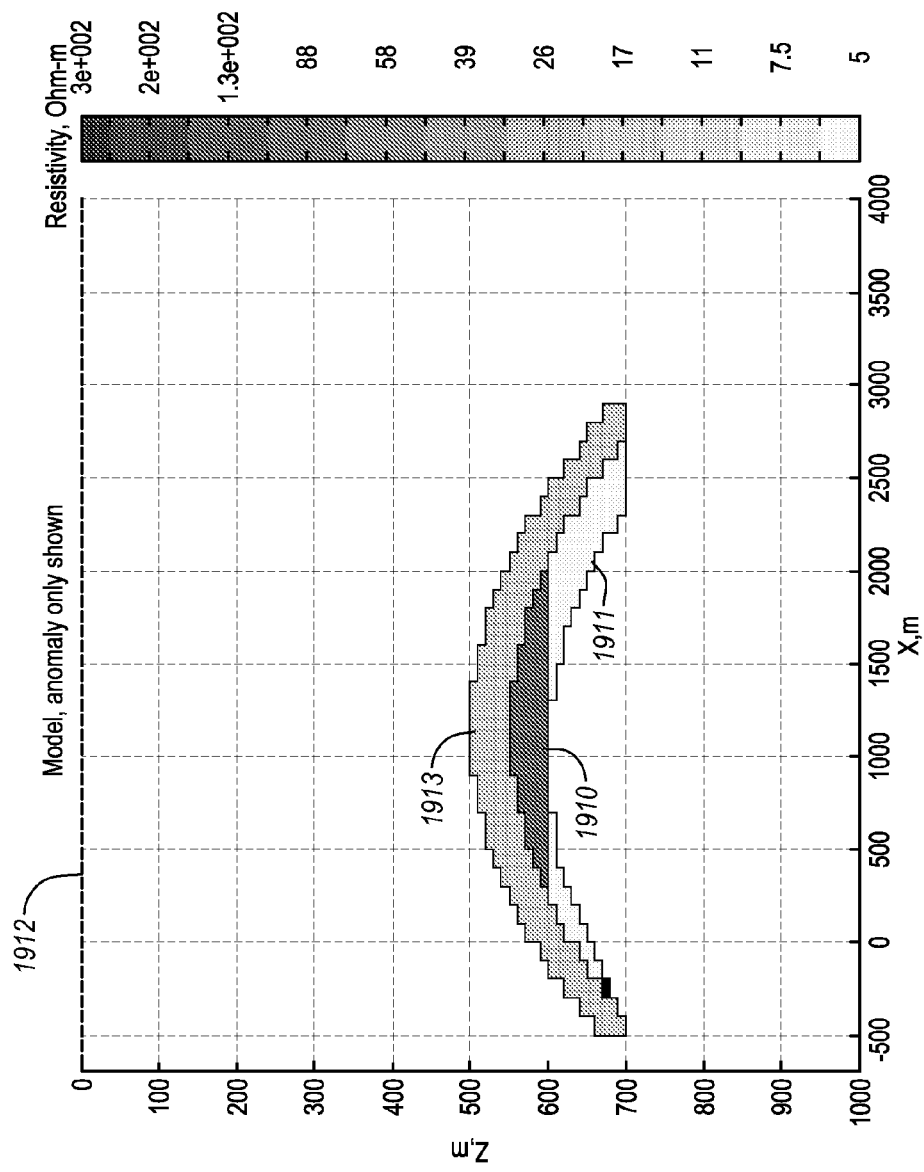
FIGS. 19 and 20 are conceptual diagrams of vertical sections of a model of a hydrocarbon reservoir.
Figure 20:
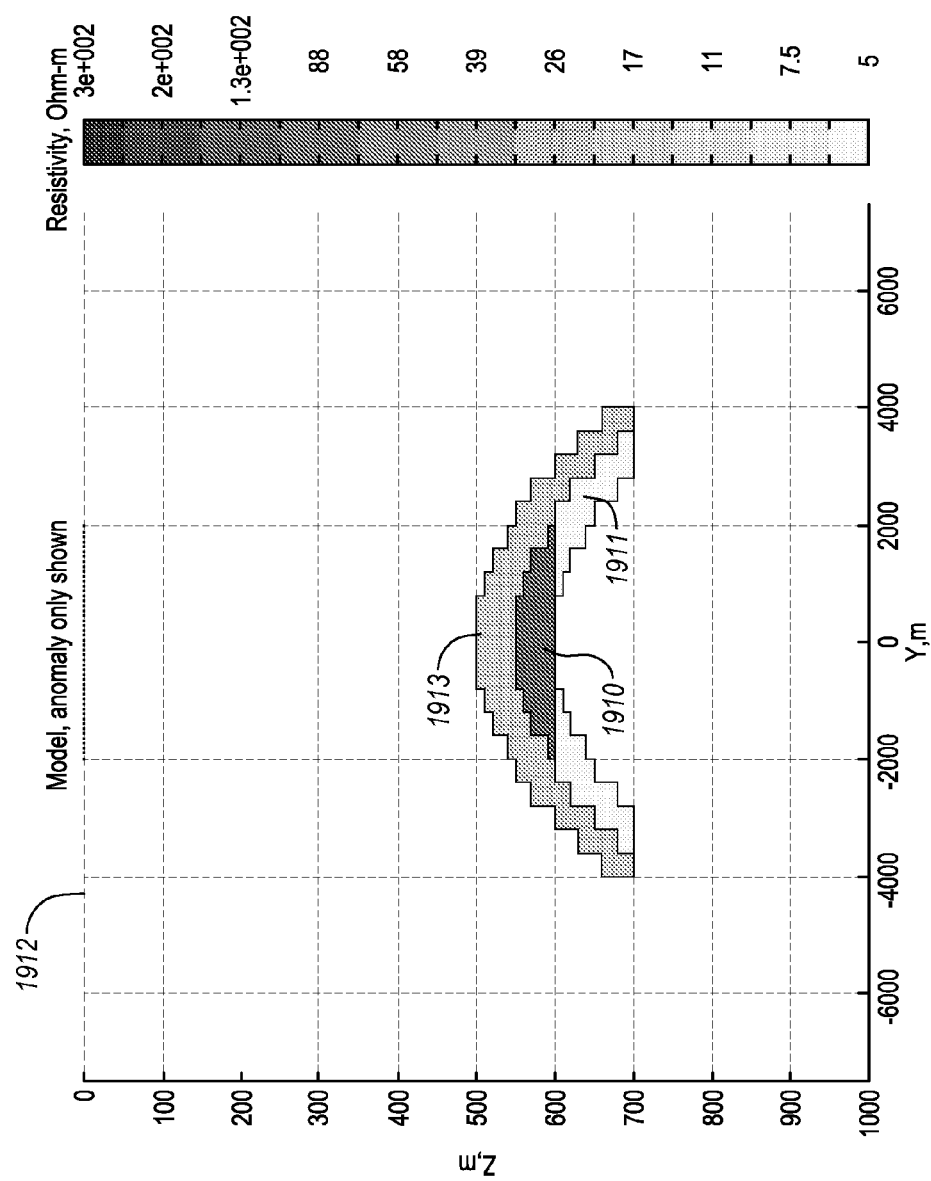

FIGS. 19 and 20 are conceptual diagrams of vertical sections of the resistivity of a hydrocarbon deposit 1910 in the geologic formation 1912. FIG. 19 shows a vertical section in the x-direction. FIG. 20 shows a vertical section in the y-direction. The hydrocarbon deposit 1910 is shown in FIGS. 19 and 20 with a resistivity of about $1.3*10^2$ Ohm-m. FIGS. 19 and 20 also illustrate the resistivity of a nearby water-filled layer 1911 and surrounding geologic formations 1913. The water-filled layer and surrounding geologic formations are shown with resistivities of about 5 Ohm-m and 17 Ohm-m, respectively. The general dimensions, such as depth, height, width, length, other dimensions, or combinations thereof may be determined using similar two dimensional models.

Figure 21A:
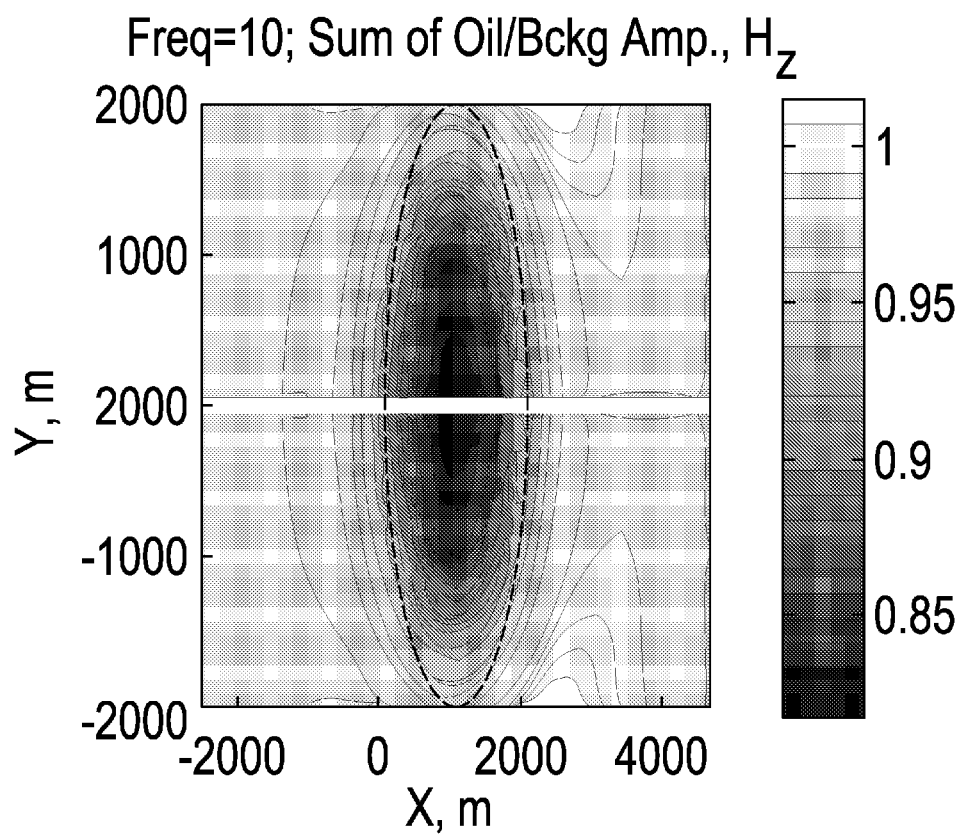
FIGS. 21A-21D illustrate conceptual diagrams of two dimensional models of data obtained using at least one embodiment of a method disclosed herein.
Figure 21B:
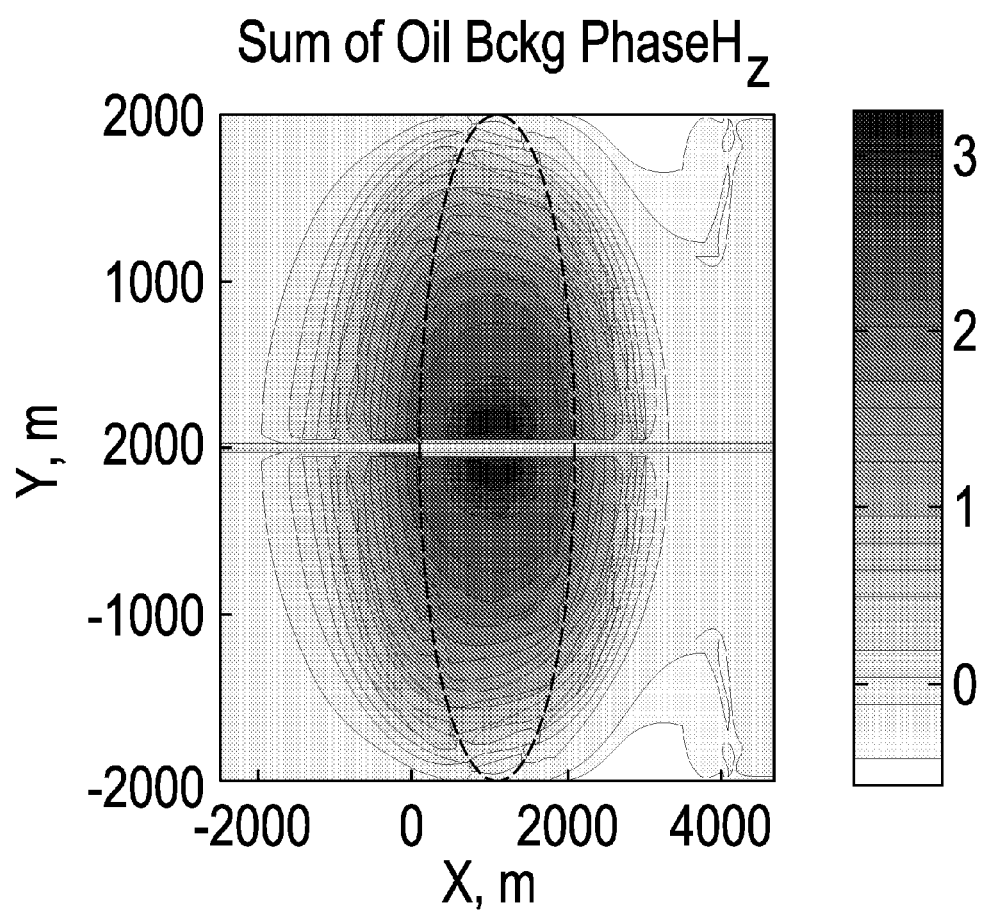
Figure 21C:
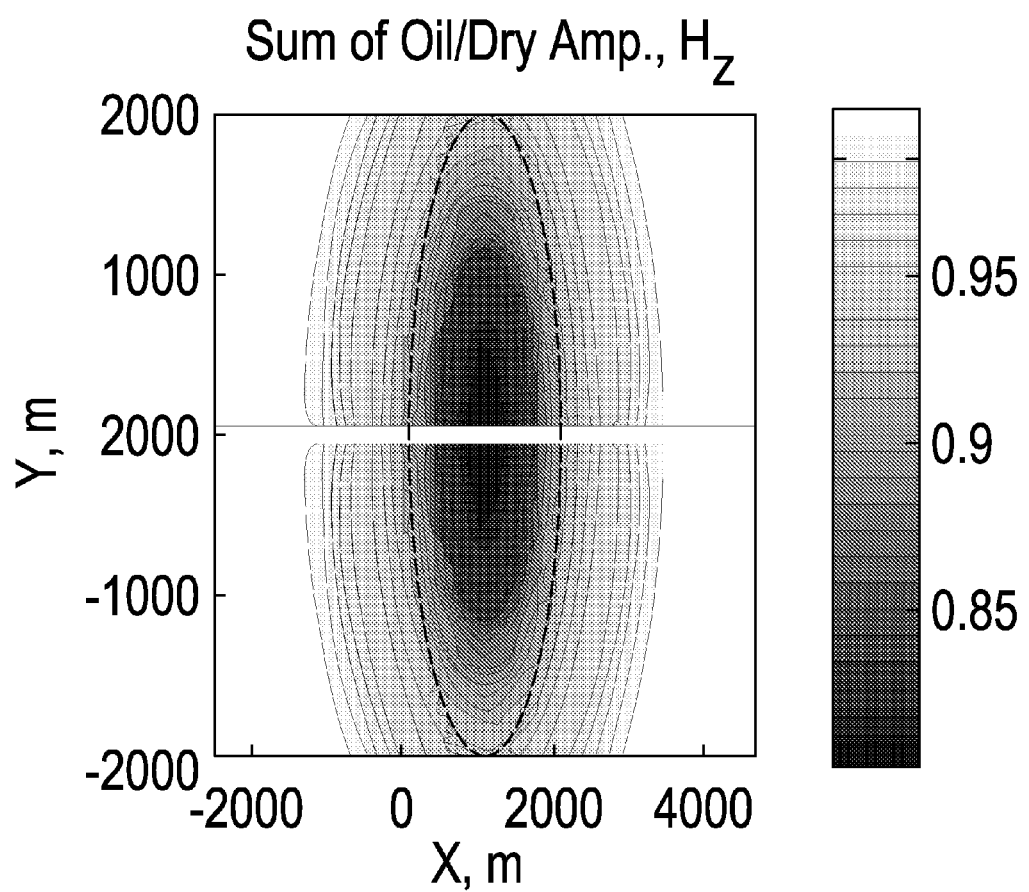
Figure 21D:
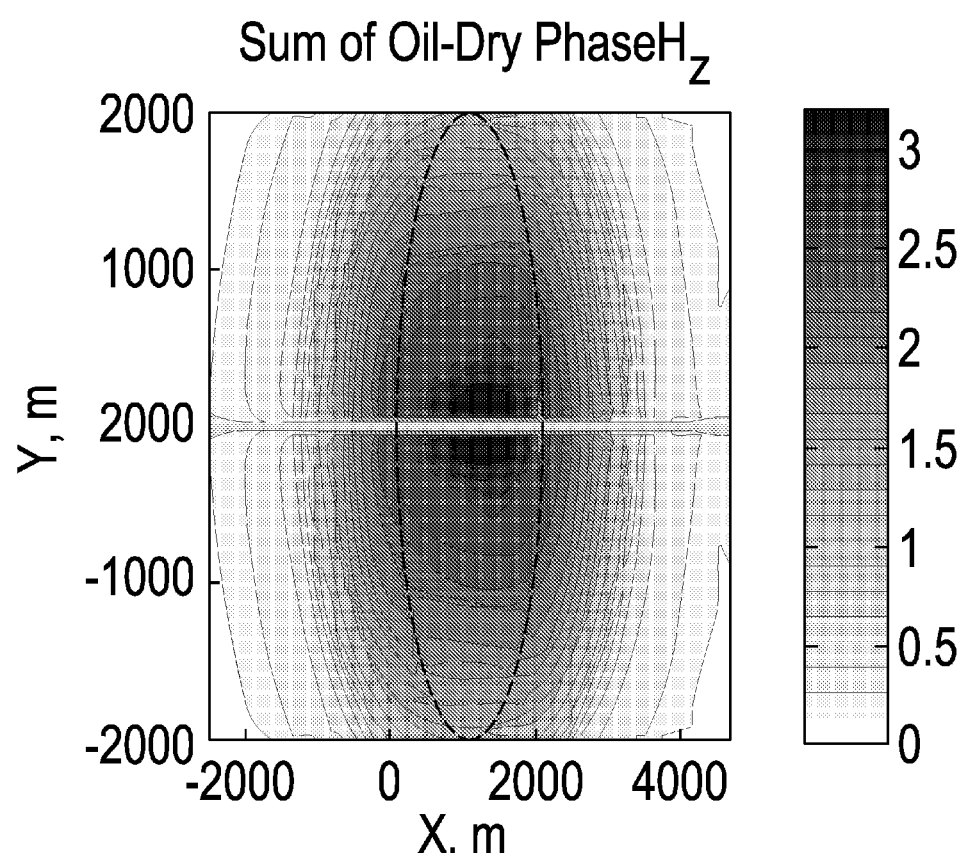

FIGS. 21A-21D illustrate conceptual diagrams of observed data obtained using at least one embodiment of a method disclosed herein. FIG. 21A illustrates the field amplitude of the vertical component of a frequency domain magnetic field measured at elevation of about 100 m above the ground over the regions shown in FIGS. 19 and 20 in the x- and y-directions at a frequency of about 10 Hz. In the present embodiment, the amplitude of the vertical component of the frequency domain magnetic field may be normalized by the reference field. The background field may include the field generated in the horizontally layered model of the earth. FIG. 21C illustrates the amplitude of the vertical component of the frequency domain magnetic field measured at elevation of about 100 m above the ground over the regions shown in FIGS. 19 and 20 in the x- and y-directions. In the present embodiment, the amplitude of the vertical component of the frequency domain magnetic field may be normalized by the reference field. The reference field may include the field generated in the model with the absence of the oil reservoir. FIG. 21B illustrates the phase of the vertical component of the frequency domain magnetic field measured at elevation of about 100 m above the ground over the regions shown in FIGS. 19 and 20 in the x- and y-directions. In the present embodiment, the phase of the vertical component of the frequency domain magnetic field may be normalized by the reference field. FIG. 21D illustrates the phase of the vertical component of the frequency domain magnetic field measured at elevation of 100 m above the ground over the regions shown in FIGS. 19 and 20 in the x- and y-directions. In the present embodiment, the phase of the vertical component of the frequency domain magnetic field may be normalized by the reference field.

Figure 22:
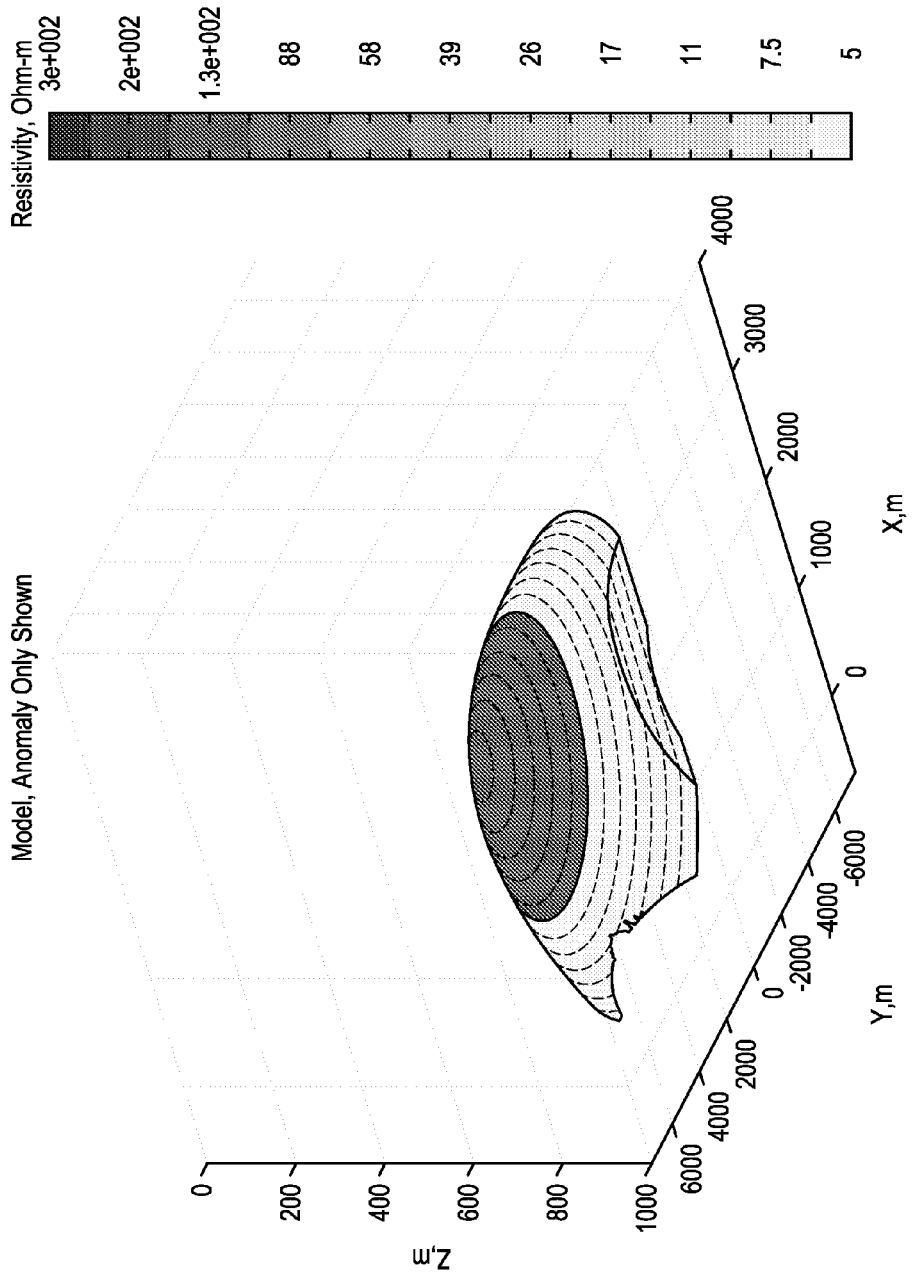
FIG. 22 is a conceptual diagram of a three dimensional model of the resistivity data obtained using at least one embodiment of a method disclosed herein.

FIG. 22 is a conceptual diagram of a three dimensional model of the hydrocarbon reservoir obtained using at least one embodiment of a method disclosed herein. The three dimensional values for depth, height, width, length, volume, other dimensions, or combinations thereof may be obtained using similar data. These dimensions and/or other characteristics of a hydrocarbon deposit may be determined using at least one of the embodiments of the methods described herein. For example, the method 200 described in connection with FIG. 2 may be used.

The method 200 may include generating 202 an electromagnetic field. The electromagnetic field may be generated 202 by an electromagnetic transmitter 1402.

At least one component of the electromagnetic field may be measured 204. At least one receiver 1404 may measure 204 the electromagnetic field. For example, at least one receiver 1404 may measure 204 at least one component of the electromagnetic field. In some embodiments, the amplitude and/or phase of the electromagnetic field may be measured 204. In further embodiments, the magnetic and/or electric components of the electromagnetic field may be measured 204.

A conductivity distribution may be determined 206 based on the at least one measured component. The conductivity distribution may include the conductivity distribution for a hydrocarbon deposit 110, geological formations, and/or other formations and/or deposits. The determined conductivity distribution may be correlated 208 with geological formations and/or hydrocarbon deposits 110.

Information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

Functions such as executing, processing, performing, running, determining, notifying, sending, receiving, storing, requesting and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes and variations which will be apparent to those skilled in the art may be made in the arrangement, operation, and details of the methods and systems of the present invention disclosed herein without departing from the spirit and scope of the invention.

What is claimed is:

1. A method for measuring the resistivity of sea-bed, ice, or geologic formations comprising:
   generating an electromagnetic field using at least one stationary long-range or short-range transmitter, wherein the electromagnetic field is generated by a transmitter formed by a system of grounded electric bipoles of at least 500 meters in length or formed by a loop of wire with the radius of at least 500 meters, wherein the frequency of the electromagnetic field is between or including the ULF/ELF range;
   measuring at least one component of the electromagnetic field using at least one mobile underwater receiver that is remotely located from the at least one long-range or short-range transmitter;
   determining a conductivity distribution based on the at least one measured component; and
   correlating the determined conductivity distribution with geological formations or hydrocarbon deposits.

2. The method of claim 1, wherein generating an electromagnetic field further comprises generating the electromagnetic field over a plurality of frequencies or in the time domain.

3. The method of claim 2, wherein generating the electromagnetic field in the time domain further comprises using a magnetohydrodynamic (MHD) generator.

4. The method of claim 2, wherein measuring at least one component of the electromagnetic field further comprises using a receiver that measures the electromagnetic field over a plurality of frequencies or in the time domain.

5. The method of claim 1, wherein generating an electromagnetic field further comprises locating a transmitter on land, on the sea ice, or in the sea.

6. The method of claim 1, wherein the electromagnetic field is generated by a transmitter formed by the system of grounded electric bipoles of more than three kilometers in length or formed by a loop of wire with the radius of at least three kilometers.

7. The method of claim 1, wherein measuring at least one component of the electromagnetic field further comprises using at least one galvanic receiver or at least one induction receiver.

8. The method of claim 7, further comprising recording the voltage detected in at least one of the receivers.

9. The method of claim 1, wherein measuring at least one component of the electromagnetic field further comprises measuring the amplitude or phase of electromagnetic field.

10. The method of claim 1, wherein using at least one mobile underwater receiver includes using an underwater survey.

11. The method of claim 10, wherein the underwater survey includes using an underwater survey vehicle selected from the group consisting of a submarine, an autonomous underwater vehicle, and a remotely operated underwater vehicle.

12. The method of claim 1, wherein measuring at least one component of the electromagnetic field further comprises using a receiver that measures a magnetic component or electric component of the electromagnetic field.

13. The method of claim 1, wherein determining a conductivity distribution is based on a plurality of measured components of the electromagnetic field and wherein the conductivity distribution is determined by determining at least one transfer function using the plurality of measured components of the electromagnetic field.

14. The method of claim 13, wherein determining at least one transfer function further comprises determining at least one of the following transfer functions selected from the group consisting of: an electric transfer function, a magnetic transfer function, an impedance transfer function, and an admittance transfer function.

15. The method of claim 13, wherein determining at least one transfer function further comprises using a linear relationship between a first component of the electromagnetic field and a second component of the electromagnetic field.

16. The method of claim 13, wherein determining at least one transfer function further comprises using a least-squares method.

17. The method of claim 1, wherein correlating the determined conductivity distribution with geological formations or hydrocarbon deposits further comprises characterizing geologic material, remotely detecting hydrocarbon deposits, or imaging the hydrocarbon deposits.

18. The method of claim 1, wherein correlating the determined conductivity distribution with geological formations or hydrocarbon deposits further comprises determining a three-dimensional conductivity distribution.

19. The method of claim 18, wherein determining a three-dimensional conductivity distribution further comprises using a three-dimensional inversion technique.

20. The method of claim 19, wherein the three-dimensional inversion technique is based on a regularized three-dimensional focusing nonlinear inversion of the at least one measured component of the electromagnetic field.

21. The method of claim 1, wherein correlating the determined conductivity distribution with geological formations or hydrocarbon deposits further comprises comparing observed data with predicted data.

22. The method of claim 21, wherein comparing observed data with predicted data further comprises minimizing a parametric functional.

23. The method of claim 22, wherein minimizing a parametric functional further comprises using gradient type methods or a misfit functional and a stabilizer.

24. The method of claim 1, wherein correlating the determined conductivity distribution with geological formations or hydrocarbon deposits further comprises stacking the measured at least one component of the electromagnetic field with a corresponding at least one component of the electromagnetic field measured at another period.

25. A method for locating mineral or hydrocarbon deposits comprising:
  generating an electromagnetic field using at least one stationary long-range or short-range transmitter located on land, on the sea ice, or in the sea, wherein the frequency of the electromagnetic field is between or including the ULF/ELF range, the electromagnetic field propagating to a mobile underwater receiver through an ionospheric waveguide or underground waveguide;
  measuring at least one component of the electromagnetic field using the mobile underwater receiver, the mobile underwater receiver being located remotely from the at least one stationary long-range or short-range transmitter;
  determining at least one transfer function based on the at least one measured component, wherein the at least one transfer function is independent of a location of the at least one stationary long-range or short-range transmitter; and
  correlating the determined transfer function with geological formations or hydrocarbon deposits.

26. A method for locating mineral or hydrocarbon deposits comprising:
  generating an electromagnetic field using at least one stationary long-range transmitter carrying a frequency domain current, wherein the frequency of the electromagnetic field is within the ELF range;
  measuring a plurality of components of the electromagnetic field using at least one magnetic or electric underwater movable receiver, wherein the at least one receiver measures the electromagnetic field over a plurality of frequencies, wherein the at least one magnetic or electric underwater movable receiver is located remotely from the at least one stationary long-range transmitter;
  determining at least one transfer function based on the plurality of measured components, wherein at least one of the following transfer functions is selected from the group consisting of: an electric transfer function, a magnetic transfer function, an impedance transfer function, and an admittance transfer function;
  correlating the determined at least one transfer function with geological formations or hydrocarbon deposits by determining a three-dimensional conductivity distribution using a three-dimensional inversion technique based on a regularized three-dimensional focusing nonlinear inversion of the plurality of measured components of the electromagnetic field;
  comparing observed data with predicted data by minimizing a parametric functional using gradient type methods or a misfit functional and a stabilizer; and
  stacking the plurality of measured components of the electromagnetic field with a corresponding plurality of measured components of the electromagnetic field measured at another period.

27. A physical non-transitory computer readable medium having stored thereon computer executable instructions that when executed by a processor cause a computing system to perform a method for measuring the resistivity of geologic formations, the method comprising:
  generating an electromagnetic field using at least one stationary long-range or short-range transmitter, wherein the electromagnetic field is generated by a transmitter formed by a system of grounded electric bipoles of at least 500 meters in length or formed by a loop of wire with the radius of at least 500 meters, wherein the frequency of the electromagnetic field is between or including the ULF/ELF range;

measuring at least one component of the electromagnetic field using at least one mobile underwater receiver that is remotely located from the at least one stationary long-range or short-range transmitter;

determining a conductivity distribution based on the at least one measured component; and correlating the determined conductivity distribution with geological formations or hydrocarbon deposits.

28. A system for measuring the resistivity of sea-bed, ice, or geologic formations, the system comprising:

at least one stationary long-range or short-range transmitter formed by a system of grounded electric bipoles of at least 500 meters in length or formed by a loop of wire with the radius of at least 500 meters, at least one mobile underwater receiver that is remotely located form the at least one stationary long-range or short-range transmitter; and a computing system, the computing system comprising:
  a processor; and
  one or more physical non-transitory computer readable medium having computer executable instructions stored thereon that when executed by the processor, cause the computing system to perform the following:
  generate an electromagnetic field using the at least one stationary long-range or short-range transmitter, wherein the frequency of the electromagnetic field is between or including the ULF/ELF range:
  measure at least on component of the electromagnetic field using the at least one mobile underwater receiver;
  determine a conductivity distribution based on the at least one measured component; and
  correlate the determined conductivity distribution with geological formations or hydrocarbon deposits.

* * * * *